United States Patent Office 2,771,455
Patented Nov. 20, 1956

2,771,455

PROCESS FOR BREAKING PETROLEUM EMULSIONS, CERTAIN OXYALKYLATED POLYEPOXIDE-TREATED AMINE-MODIFIED THERMOPLASTIC PHENOL-ALDEHYDE RESINS AND METHOD OF MAKING SAME

Melvin De Groote, University City, and Kwan-Ting Shen, Brentwood, Mo., assignors to Petrolite Corporation, Wilmington, Del., a corporation of Delaware No Drawing. Application July 30, 1953,
Serial No. 371,414

20 Claims. (Cl. 252—344)

The present invention is a continuation-in-part of our co-pending application, Serial No. 364,505, filed June 26, 1953.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

The present invention relates to the breaking of petroleum emulsions by the use of compounds obtained by oxyalkylating with a polyepoxide the products obtained by condensing phenol-aldehyde resins having an average molecular weight corresponding to at least 3 and not over 6 phenolic nuclei per resin molecule, which resins are reaction products of 2,4,6 $C_4$–$C_{24}$ aliphatic substituted phenols with a $C_1$–$C_8$ aldehyde, with certain cyclic amidines, hereinafter described in detail, and formaldehyde followed by reacting this product with ethylene, propylene, or butylene oxide, glycide, or mixtures thereof, and with the use of two moles of the resin condensate to one mole of the polyepoxide, the polyepoxide being non-aryl, as more fully explained hereafter.

The present invention is characterized by the use of compounds derived from diglycidyl ethers which do not introduce any hydrophobe properties in its usual meaning but, in fact, are more apt to introduce hydrophile properties. Thus, the diepoxides employed in the present invention are characterized by the fact that the divalent radical connecting the terminal epoxide radicals contains less than 5 carbon atoms in an uninterrupted chain.

The diepoxides employed in producing the compositions used in the present process are obtained from glycols such as ethylene glycol, diethylene glycol, propylene glycol, dipropylene glycol, tripropylene glycol, glycerol, diglycerol, triglycerol, and similar compounds. Such products are well known and are characterized by the fact that there are not more than 4 uninterrupted carbon atoms in any group which is part of the radical joining the epoxide groups. Of necessity such diepoxides must be nonaryl or aliphatic in character.

The diepoxides employed in the present process are usually obtained by reacting a glycol or equivalent compound, such as glycerol or diglycerol, with epichlorohydrin and subsequently with an alkali. Such diepoxides have been described in the literature and particularly the patent literature. See, for example, Italian Patent No. 400,973, dated August 9, 1951; see, also, British Patent 518,057, dated December 10, 1938; and U. S. Patent No. 2,070,990, dated February 16, 1937, to Groll et al. Reference is made also to U. S. Patent 2,581,464, dated January 8, 1952, to Zech. This particular last mentioned patent describes a composition of the following general formula:

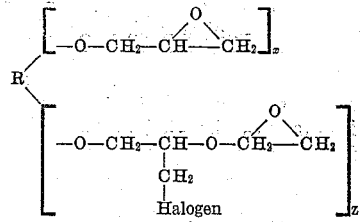

in which $x$ is at least 1, $z$ varies from less than 1 to more than 1, and $x$ and $z$ together are at least 2 and not more than 6, and R is the residue of the polyhydric alcohol remaining after replacement of at least 2 of the hydroxyl groups thereof with the epoxide ether groups of the above formula, and any remaining groups of the residue being free hydroxyl groups.

It is obvious from what is said in the patent that variants can be obtained in which the halogen is replaced by a hydroxyl radical; thus, the formula would become

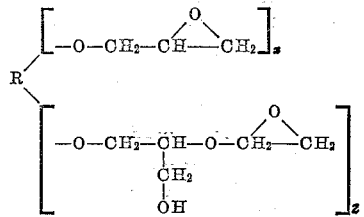

Reference to being thermoplastic characterizes them as being liquids at ordinary temperature or readily convertible to liquids by merely heating below the point of pyrolysis and thus differentiates them from infusible resins. Reference to being soluble in an organic solvent means any of the usual organic solvents such as alcohols, ketones, esters, ethers, mixed solvents, etc. Reference to solubility is merely to differentiate from a reactant which is not soluble and might be not only insoluble but also infusible. Furthermore, solubility is a factor insofar that it sometimes is desirable to dilute the compound containing the epoxy rings before reacting with an amine condensate. In such instances, of course, the solvent selected would have to be one which is not susceptible to oxyalkylation as, for example, kerosene, benzene, toluene, dioxane, possibly various ketones, chlorinated solvents, dibutyl ether, dihexyl ether, ethyleneglycol dithylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i. e., the 1,3-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of strictly formal nomenclature as in the example of the simplest diepoxide which contains at least 4 carbon atoms and is formally described as 1,2-epoxy-3,4-epoxybutane(1,2-3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric compounds containing an average of more than one epoxide group per molecule and free from functional groups other than epoxide and hydroxyl groups. The compounds which were included are limited to the monomers or the low molal members of such series and generally contain two epoxide rings per molecule and may be entirely free from a hydroxyl group. This is important because the instant invention is directed towards products which are not insoluble resins and have certain solubility characteristics not inherent in the usual thermosetting resins. Simply for purpose of illustration to show a typical diglycidyl ether of the kind herein employed, reference is made to the following formula:

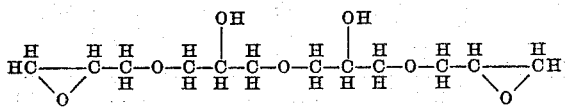

or if derived from cyclic diglycerol the structure would be thus:

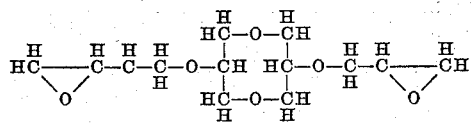

or the equivalent compound wherein the ring structure involves only 6 atoms, thus:

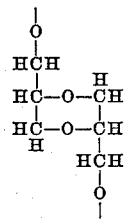

Commercially available compounds seem to be largely the former with comparatively small amounts, in fact, comparatively minor amounts, of the latter.

Having obtained a reactant having generally 2 epoxy rings as depicted in the next to last formula preceding, or low molal polymers thereof, it becomes obvious the reaction can take place with any amine-modified phenolaldehyde resin by virtue of the fact that there are always present reactive hydroxyl groups which are part of the phenolic nuclei and there may be present reactive hydrogen atoms attached to a nitrogen atom, or an oxygen atom, depending on the presence of a hydroxylated group or secondary amino group.

To illustrate the products which represent the subject matter of the present invention reference will be made to a reaction involving a mole of the oxyalkylating agent, i. e., the compound having two oxirane rings and an amine condensate. Proceeding with the example previously described it is obvious the reaction ratio of two moles of the amine condensate to one mole of the oxyalkylating agent gives a product which may be indicated as follows:

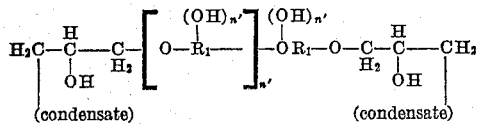

in which $n'$ is a small whole number less than 10, and usually less than 4, and including 0, and $R_1$ represents a divalent radical as previously described being free from any radical having more than 4 uninterrupted carbon atoms in a single chain, and the characterization "condensate" is simply an abbreviation for the condensate which is described in greater detail subsequently.

Such intermediate product in turn also must be soluble but solubility is not limited to an organic solvent but may include water, or for that matter, a solution of water containing an acid such as hydrochloric acid, acetic acid, hydroxyacetic acid, gluconic acid, etc. In other words, the nitrogen groups present, whether two or more, may or may not be significantly basic and it is immaterial whether aqueous solubility represents an anhydro base or the free base (combination with water) or a salt form such as the acetate, chloride, etc. The purpose in the instance is to differentiate from insoluble resinous materials, particularly those resulting from gelation or crosslinking. Not only does this property serve to differentiate from instances where an insoluble material is desired but also serves to emphasize the fact that in many instances the preferred compounds have distinct watersolubility or are distinctly dispersible in 5% gluconic acid. For instance, the products free from any solvent can be shaken with 5 to 20 times their weight of 5% gluconic acid at ordinary temperature and show at least some tendency towards being self-dispersing. The solvent which is generally tried is xylene. If xylene alone does not serve then a mixture of xylene and methanol, for instance, 80 parts of xylene and 20 parts of methanol, or 70 parts of xylene and 30 parts of methanol, can be used. Sometimes it is desirable to add a small amount of acetone to the xylene-methanol mixture, for instance, 5% to 10% of acetone.

A mere examination of the nature of the products before and after treatment with a polyepoxide reveals that the polyepoxide by and large introduces increased hydrophile character or, inversely, causes a decrease in hydrophobe character. However, the solubility characteristics of the final product, i. e., the product obtained by oxyalkylation of a monoepoxide, may vary all over the map. This is perfectly understandable because ethylene oxide, glycide, and to a lesser extent methyl glycide, introduce predominantly hydrophile character, or propylene oxide and more especially butylene oxide, introduce primarily hydrophobe character. A mixture of the various oxides will produce a balancing in solubility characteristics or in the hydrophobe-hydrophile character so as to be about the same as prior to oxyalkylation with the monoexopide.

As far as the use of the herein described products goes for purpose of resolution of petroleum emulsions of the water-in-oil type, we particularly prefer to use those which as such or in the form of the free base or hydrate, i. e., combination with water or particularly in the form of a low molal organic acid salt such as the gluconates or the acetate or hydroxyacetate, have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene-glycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

For purpose of convenience what is said hereinafter will be divided into seven parts:

Part 1 is concerned with the hydrophile nonaryl polyepoxides and particularly diepoxides employed as reactants;

Part 2 is concerned with the phenol-aldehyde resin which is subjected to modification by condensation to yield the amine-modified resin;

Part 3 is concerned with appropriate basic cyclic amidines which may be employed in the preparation of the herein-described amine-modified resins;

Part 4 is concerned with reactions involving the resin, the amine, and formaldehyde to produce specific products or compounds which are then subjected to reaction with polyepoxides, and particularly diepoxides;

Part 5 is concerned with reactions involving the two preceding types of materials and examples obtained by such reaction. Generally speaking, this involves nothing more than reaction between 2 moles of a previously-prepared amine-modified phenol-aldehyde resin condensate as described and one mole of a hydrophile polyepoxide so as to yield a new and larger resin molecule, or comparable product;

Part 6 is concerned with the use of a monoepoxide in oxyalkylating the products described in Part 5, preceding, i. e., those derived by means of reaction between a polyepoxide and an amine-modified phenol-aldehyde resin as described;

Part 7 is concerned with the resolution of petroleum emulsions of the water-in-oil type by means of the previously described chemical compounds or reaction products.

PART 1

Reference is made to previous patents as illustrated in the manufacture of the nonaryl polyepoxides and particularly diepoxides employed as reactants in the instant invention. The simplest diepoxide is probably the one derived from 1,3-butadiene or isoprene. Such derivatives are obtained by the use of peroxides or by other suitable means and the diglycidyl ethers may be indicated thus:

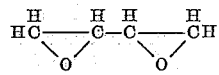

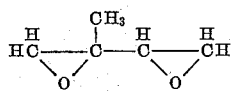

In some instances the compounds are essentially derivatives of etherized epichlorohydrin or methyl epichlorohydrin. Needless to say, such compounds can be derived from glycerol monochlorohydrin by etherization prior to ring closure. An example is illustrated in the previously mentioned Italian Patent No. 400,973:

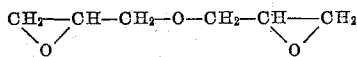

Another type of diepoxide is diisobutenyl dioxide as described in aforementioned U. S. Patent No. 2,070,990, dated February 16, 1937, to Groll, and is of the following formula

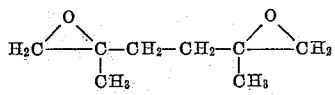

The diepoxides previously described may be indicated by the following formula

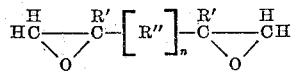

in which R' represents a hydrogen atom or methyl radical and R'' represents the divalent radical uniting the two terminal epoxide groups, and n' is the numeral 0 or 1. As previously pointed out, in the case of the butadiene derivative, n' is 0. In the case of diisobutenyl dioxide R'' is CH₂—CH₂ and n' is 1. In another example previously referred to R'' is CH₂OCH₂ and n' is 1.

However, for practical purposes the only diepoxide available in quantities other than laboratory quantities is a derivative of glycerol or epichlorohydrin. This particular diepoxide is obtained from diglycerol which is largely acyclic diglycerol, and epichlorohydrin or equivalent thereof in that the epichlorohydrin itself may supply the glycerol or diglycerol radical in addition to the epoxy rings. As has been suggested previously, instead of starting with glycerol or a glycerol derivative, one could start with any one of a number of glycols or polyglycols and it is more convenient to include as part of the terminal oxirane ring radical the oxygen atom that was derived from epichlorohydrin or, as might be the case, methyl epichlorohydrin. So presented the formula becomes:

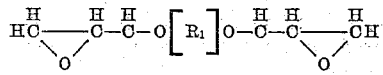

In the above formula R₁ is selected from groups such as the following:

C₂H₄
C₂H₄OC₂H₄
C₂H₄OC₂H₄OC₂H₄
C₃H₆
C₃H₆OC₃H₆
C₃H₆OC₃H₆OC₃H₆
C₄H₈
C₄H₈OC₄H₈
C₄H₈OC₄H₈OC₄H₈
C₃H₅(OH)
C₄H₅(OH)OC₃H₅(OH)
C₃H₅(OH)OC₃H₅(OH)OC₃H₅(OH)

It is to be noted that in the above epoxides there is a complete absence of (a) aryl radicals and (b) radical in which 5 or more carbon atoms are united in a single uninterrupted single group. R₁ is inherently hydrophile in character as indicated by the fact that it is specified that the precusory diol or polyol OHROH must be water-soluble in substantially all proportions, i. e., water miscible.

Stated another way, what is said previously means that a polyepoxide such as

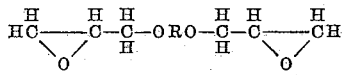

is derived actually or theoretically, or at least derivable, from the diol HOROH, in which the oxygen-linked hydrogen atoms were replaced by

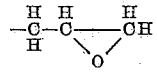

Thus, R(OH)ₙ, where n represents a small whole number which is 2 or more, must be water-soluble. Such limitation excludes polyepoxides if actually derived or theoretically derived at least, from water-insoluble diols or water-insoluble triols or higher polyols. Suitable polyols may contain as many as 12 to 20 carbon atoms or thereabouts.

Referring to a compound of the type above in the formula

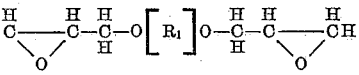

in which R₁ is C₃H₅(OH) it is obvious that reaction with another mole of epichlorohydrin with appropriate ring closure would produce a triepoxide or, similarly, if R happened to be C₃H₅(OH)OC₃H₅(OH), one could obtain a tetraepoxide. Actually, such procedure generally yields triepoxides, or mixtures with higher epoxides and perhaps in other instances mixtures in which diepoxides are almost present. Our preference is to use the diepoxides.

There is available commercially at least one diglycidyl ether free from aryl groups and also free from any radical having 5 or more carbon atoms in an uninterrupted chain.

This particular diglycidyl ether is obtained by the use of epichlorohydrin in such a manner that approximately 4 moles of epichlorohydrin yield one mole of the diglycidyl ether, or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this diepoxide will be referred to as diglycidyl ether A. Such material corresponds in a general way to the previous formula.

Using laboratory procedure we have reacted diethyleneglycol with epichlorohydrin and subsequently with alkali so as to produce a product which, on examination, corresponded approximately to the following compound:

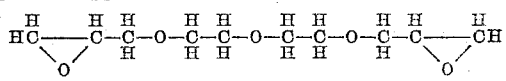

The molecular weight of the product was assumed to be 230 and the product was available in laboratory quantities only. For this reason, the subsequent table referring to the use of this particular diepoxide, which will be referred to as diglycidyl ether B, is in grams instead of pounds.

Probably the simplest terminology for these polyepoxides, and particularly diepoxides, to differentiate from comparable aryl compounds is to use the terminology "epoxyalkanes" and, more particularly, polyepoxyalkanes or diepoxyalkanes. The difficulty is that the majority of these compounds represent types in which a carbon atom chain is interrupted by an oxygen atom and, thus, they are not strictly alkane derivatives. Furthermore, they may be hydroxylated or represent a heterocyclic ring. The principal class properly may be referred to as polyepoxypolyglycerols, or diepoxypolyglycerols.

Other examples of diepoxides involving a heterocyclic ring having, for example, 3 carbon atoms and 2 oxygen atoms are, obtainable by the conventional reaction of combining erythritol with a carbonyl compound such as formaldehyde or acetone, so as to form the 5-membered ring, followed by conversion of the terminal hydroxyl groups into epoxy radicals.

PART 2

It is well known that one can readily purchase on the open market, or prepare, fusible, organic solvent-soluble, water-insoluble resin polymers of a composition approximated in an idealized form by the formula

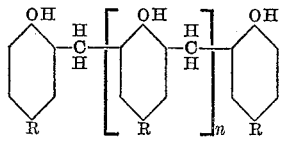

In the above formula $n$ represents a small whole number varying from 1 to 6, 7, or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 15 carbon atoms, such as butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance paraphenylphenol, one may obtain a resin which is not soluble in a nonoxygenated solvent, such as benzene, or xylene, but requires an oxygenated solvent such as a low molal alcohol, dioxane, or diethyleneglycol diethylether. Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser.

If one selected a resin of the kind just described previously and reacted approximately one mole of the resin with two moles of formaldehyde and two moles of a cyclic amidine as specified, following the same idealized over-simplification previously referred to, the resultant product might be illustrated thus:

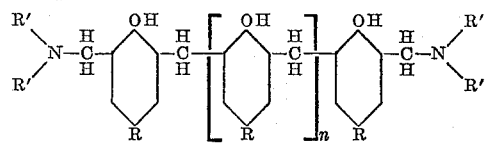

The amidine may be designed thus:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

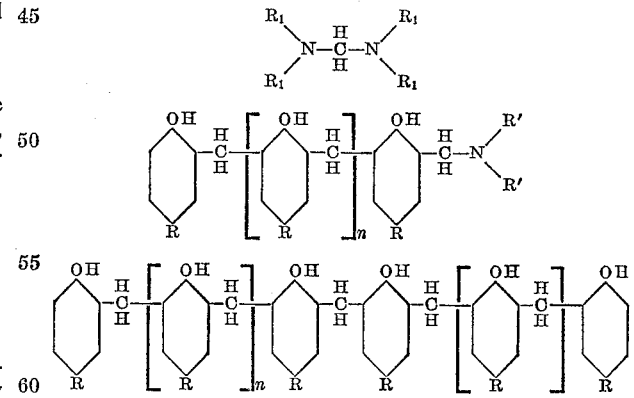

As has been pointed out previously, as far as the resin unit goes one can use a mole of aldehyde other than formaldehyde, such as acetaldehyde, propionaldehyde or butyraldehyde. The resin unit may be exemplified thus:

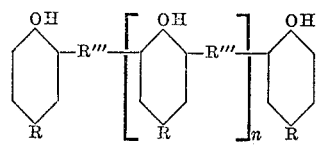

in which R''' is the divalent radical obtained from the particular aldehyde employed to form the resin. For reasons which are obvious the condensation product obtained appears to be described best in terms of the method of manufacture.

Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i.e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purposes of convenience suitable resins are characterized in the following table:

TABLE I

| Example number | R | Position of R | R''' derived from— | n | Mol. wt. of resin molecule (based on n+2) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 3

The expression "cyclic amidines" is employed in its usual sense to indicate ring-compounds in which there are present either 5 members or 6 members, and having 2 nitrogen atoms separated by a single carbon atom supplemented by either two additional carbon atoms or three additional carbon atoms completing the ring. All the carbon atoms may be substituted. The nitrogen atom of the ring involving two monovalent linkages may be substituted. Needless to say, these compounds include members in which the substituents also may have one or more nitrogen atoms, either in the form of amino nitrogen atoms or in the form of acylated nitrogen atoms.

These cyclic amidines are sometimes characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids such as polycarboxy acids.

Cyclic amidines obtained from oxidized wax acids are described in detail in co-pending Blair application, Serial No. 274,075, filed February 28, 1952, now Patent No. 2,693,468. Instead of being derived from oxidized wax acids, the cyclic compounds herein employed may be obtained from any acid from acetic acid upward, and may be obtained from acids, such as benzoic, or acids in which there is a reoccurring ether linkage in the acyl radical. In essence then, with this difference said aforementioned co-pending Blair application, Serial No. 274,075, describes compounds of the following structure:

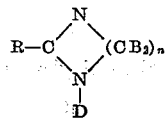

where R is a member of the class consisting of hydrocarbon radicals having up to approximately 30 carbon atoms and includes hydroxylated hydrocarbon radicals and also hydrocarbon radicals in which the carbon atom chain is interrupted by oxygen; $n$ is the numeral 2 to 3, D is a member of the class consisting of hydrogen and organic radicals containing less than 25 carbon atoms, composed of the elements from the group consisting of C, N, O and H, and B is a member of the group consisting of hydrogen and hydrocarbon radicals containing less than 7 carbon atoms, with the proviso that at least three occurrences of B are hydrogen.

The preparation of an imidazoline substituted in the two-position by lower aliphatic hydrocarbon radicals is described in the literature and is readily carried out by reaction between a monocarboxylic acid or ester or amide and a diamine or polyamine, containing at least one primary amino group, and at least one secondary amino group or a second primary amino group separated from the first primary amino group by two carbon atoms.

Examples of suitable polyamines which can be employed as reactants to form basic nitrogen-containing compounds of the present invention include polyalkylene polyamines such as ethylene-diamine, diethylenetriamine, triethylenetetramine, tetraethylenepentamine, and higher polyethylene polyamines, and also including 1,2-diamonopropane, N-ethylethylenediamine, N,N-dibutyldiethylenetriamine, 1,2-diamonobutane, hydroxyethylethylenediamine, 1,2-propylenetriamine, and the like.

For details of the preparation of imidazolines substituted in the 2-position from amines of this type, see the following U. S. Patents: U. S. No. 1,999,989, dated April 30, 1935, Max Bockmuhl et al.; U. S. No. 2,155,877, dated April 25, 1939, Edmund Waldmann et al.; and U. S. No. 2,155,878, dated April 25, 1939, Edmund Waldmann et al. Also see Chem. Rev., 32, 47 (43).

Equally suitable for use in preparing compounds of my invention and for the preparation of tetrahydropyrimidines substituted in the 2-position are the polyamines containing at least one primary amino group and at least one secondary amino group, or another primary amino group separated from the first primary amino group by three carbon atoms. This reaction is generally carried out by heating the reactants to a temperature of 230° C., or higher, usually within the range of 250° C. to 300° C., at which temperatures water is evolved and ring closure is effected. For details of the preparation of tetrahydropyrimidines, see German Patent No. 700,371, dated December 18, 1940, to Edmund Waldmann and August Chwala; German Patent No. 701,322, dated January 14, 1941, to Karl Miescher, Ernst Erech and Willi Klarer; and U. S. Patent No. 2,194,419, dated March 19, 1940, to August Chwala.

Examples of amines suitable for this synthesis include 1,3-propylenediamine, trimethylenediamine, 1,3-diaminobutane, 2,4-diaminopentane, N-ethyl-trimethylenediamine, N-aminoethyltrimethylene diamine, aminopropyl stearylamine, tripropylenetetramine, tetrapropylenepentamine, high boiling polyamines prepared by the condensation of 1,3-propylene dichloride with ammonia, and similar diamines or polyamines in which there occurs at least one primary amino group separated from another primary or secondary amino group by three carbon atoms.

The present invention is concerned with a condensation reaction, in which one class of reactants are substituted ring compounds

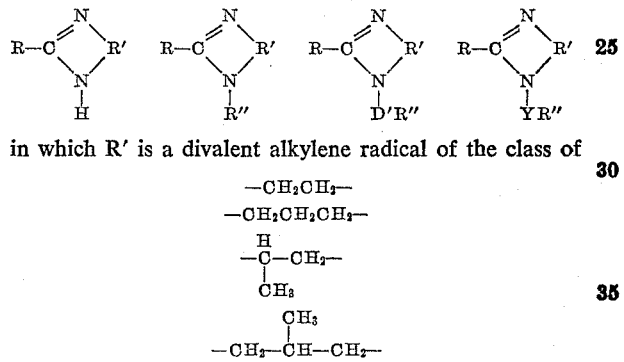

in which R' is a divalent alkylene radical of the class of

—CH$_2$CH$_2$—

—CH$_2$CH$_2$CH$_2$—

$$-\overset{H}{\underset{CH_3}{C}}-CH_2-$$

$$-CH_2-\overset{CH_3}{\underset{}{CH}}-CH_2-$$

and in which D' represents a divalent, non-amino, organic radical containing less than 25 carbon atoms, composed of elements including C, H, O, and N, Y represents a divalent, organic radical containing less than 25 carbon atoms, composed of elements including C, H, O, and N, and containing at least one amino group, and R includes hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R" includes hydrogen, aliphatic radicals and cycloaliphatic radicals, with the proviso that in the occurrence of the radicals R and R" there be present at least one group of 8 to 32 uninterrupted carbon atoms. In the present instance, however, there is no limitation in regard to the radicals R and R".

As to the six-membered ring compounds generally referred to as substituted pyrimidines, and more particularly as substituted tetra-hydropyrimidines, see U. S. Patent No. 2,534,828, dated December 19, 1950, to Mitchell et al. With the modification as far as the instant application goes, the hydrocarbon group R may have the same variation as when it is part of the five-membered ring previously referred to and is not limited to an alkyl group having at least 10 carbon atoms as in the instance of the aforementioned U. S. Patent No. 2,534,828.

For the purpose of the present invention there is selected from the broad case of compounds previously described such members as meet the following limitations: (a) Have present at least one basic secondary amino radical; and (b) be free from primary amino groups and especially basic primary amino groups. Such compounds may have two-ring membered radicals present instead of one ring-membered radical and may or may not have present a tertiary amine radical or hydroxyl radical, such as a hydroxy alkyl radical. A large number of compounds have been described in the literature meeting the above specifications, of which quite a few appear in the aforementioned issued U. S. patents. Examples selected from the patents include the following:

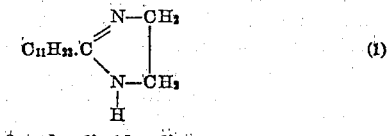

2-undecylimidazoline

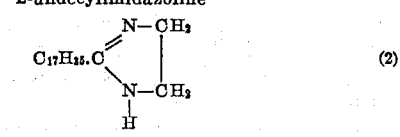

2-heptadecylimidazolines

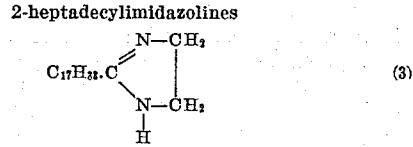

2-oleylimidazoline

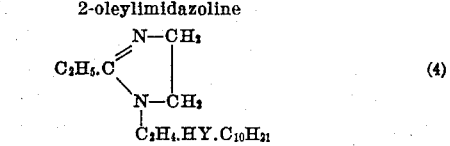

1-N-decylaminoethyl,2-ethylimidazoline

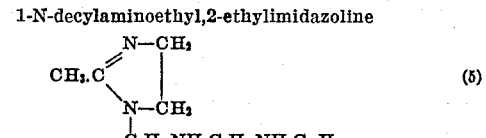

2-methyl,1-hexadecylaminoethylaminoethylimidazoline

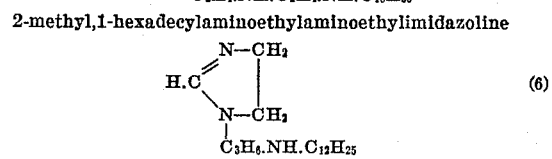

1-dodecylaminopropylimidazoline

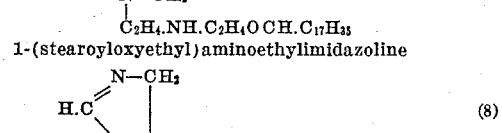

1-(stearoyloxyethyl)aminoethylimidazoline

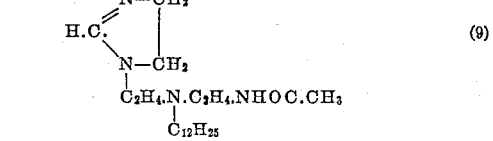

1-stearamidoethylaminoethylimidazoline

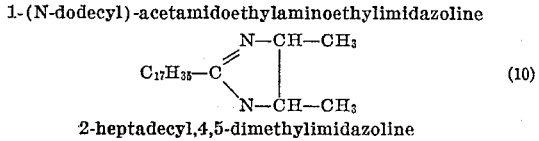

1-(N-dodecyl)-acetamidoethylaminoethylimidazoline

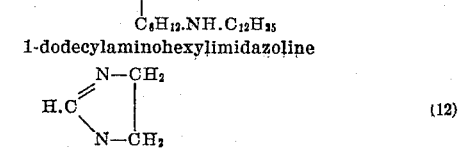

2-heptadecyl,4,5-dimethylimidazoline

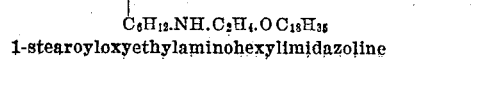

1-dodecylaminohexylimidazoline

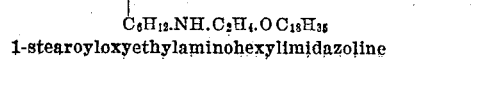

1-stearoyloxyethylaminohexylimidazoline

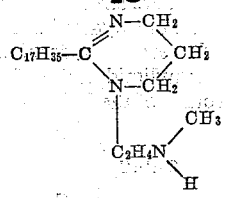

2-heptadecyl,1-methylaminoethyltetrahydropyrimidine (13)

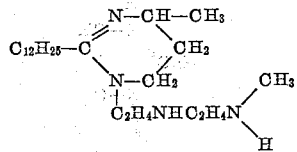

4-methyl,2-dodecyl,1-methylaminoethylaminoethyl tetrahydropyrimidine (14)

As has been pointed out previously, the reactants herein employed may have two substituted imidazoline rings or two substituted tetrahydropyrimidine rings. Such compounds are illustrated by the following formula:

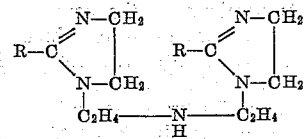

Such compounds can be derived, of course, from triethylenetetramine, tetraethylenepentamine, pentaethylenehexamine, and higher homologues. The substituents may vary depending on the source of the hydrocarbon radical, such as the lower fatty acids and higher fatty acids, a resin acid, naphthenic acid, or the like. The group introduced may or may not contain a hydroxyl radical as in the case of hydroxyacetic acid, acetic acid, ricinoleic acid, oleic acid, etc.

One advantage of a two-ring compound resides in the fact that primary amino groups which constitute the terminal radicals of the parent polyamine, whether a polyethylene amine or polypropylene amine, are converted so as to eliminate the presence of such primary amino radicals. Thus, the two-membered ring compound meets the previous specification in regard to the nitrogen-containing radicals.

Another procedure to form a two-membered ring compound is to use a dibasic acid. Suitable compounds are described, for example, in aforementioned U. S. Patent No. 2,194,419, dated March 19, 1940, to Chwala.

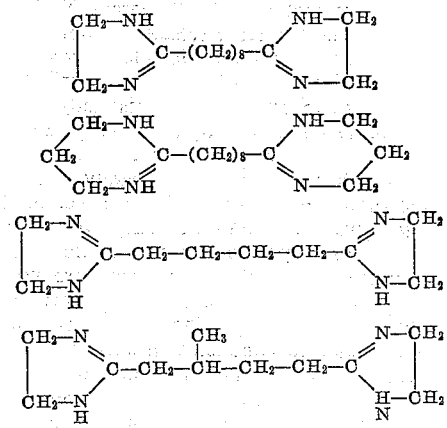

As to compounds having a tertiary amine radical, it is obvious that one can employ derivatives of polyamines in which the terminal groups are unsymmetrically alkylated. Initial polyamines of this type are illustrated by the following formula:

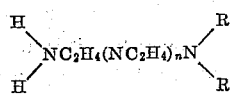

in which R represents a small alkyl radical such as methyl, ethyl, propyl, etc., and $n$ represents a small whole number greater than unity such as 2, 3 or 4. Substituted imidazolines can only be formed from that part of the polyamine which has a primary amino group present. There is no objection to the presence of a tertiary amino radical as previously pointed out. Such derivatives, provided there is more than one secondary amino radical present in the ring compound, may be reacted with an alkylene oxide, such as ethylene oxide, propylene oxide, glycide, etc., so as to convert one or more amino nitrogen radicals into the corresponding hydroxyl alkyl radical, provided, however, that there is still a residue secondary amine group. For instance, in the preceding formula if $n$ represents 4 it means the ring compound would have two secondary nitrogen radicals and could be treated with a single mole of an alkylene oxide and still provide a satisfactory reactant for the herein described condensation reaction.

Ring compounds, such as substituted imidazolines, may be reacted with a substantial amount of alkylene oxide as noted in the preceding paragraph and then a secondary amino group introduced by two steps; first, reaction with an ethylene imine, and second, reaction with another mole of the oxide, or with an alkylating agent such as dimethyl sulfate, benzyl chloride, a low molal ester of a sulfonic acid, an alkyl bromide, etc.

As to oxyalkylated imidazolines and a variety of suitable high molecular weight carboxy acids which may be the source of a substituent radical, see U. S. Patent No. 2,468,180, dated April 26, 1949, to De Groote and Keiser.

Other suitable means may be employed to eliminate a terminal primary amino radical. If there is additionally a basic secondary amino radical present then the primary amino radical can be subjected to acylation notwithstanding the fact that the surviving amino group has no significant basicity. As a rule acylation takes place at the terminal primary amino group rather than at the secondary amino group, thus one can employ a compound such as

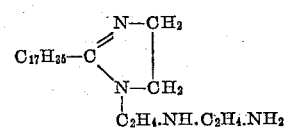

and subject it to acylation so as to obtain, for example, acetylated 2-heptadecyl, 1-diethylenediaminoimidazoline of the following structure:

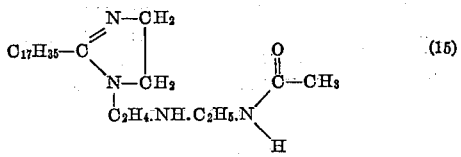 (15)

Similarly, a compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as

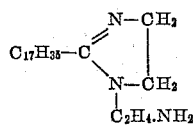

which can be reacted with a single mole of ethylene oxide, for example, to produce the hydroxy ethyl derivative of 2-heptadecyl,1-amino-ethylimidazoline, which can be illustrated by the following formula:

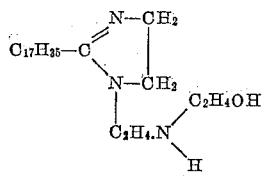 (16)

Other reactants may be employed in connection with an initial reactant of the kind described above, to wit, 2-heptadecyl,1-amino-ethylimidazoline; for instance, reaction with an alkylene imine such as ethylene imine, propylene imine, etc. If reacted with ethylene imine the net result is to convert a primary amino radical into a secondary amino radical and also introduces a new primary amino group. If ethylene imine is employed, the net result is simply to convert 2-heptadecyl,1-amino-ethylimidazoline into 2-heptadecyl,1-diethylene-diamino-imidazoline. However, if propylene imine is used the net result is a compound which can be considered as being derived hypothetically from a mixed polyalkylene amine, i. e., one having both ethylene groups and a propylene group between nitrogen atoms.

A more satisfactory reactant is to employ one obtained by the reaction of epichlorohydrin on a secondary alkyl amine, such as the following compound:

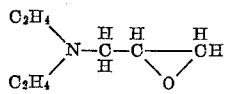

If a mole of 2-heptadecyl,1-aminoethylimidazoline is reacted with a mole of the compound just described, to wit,

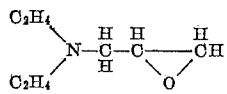

the resultant compound has a basic secondary amino group and a basic tertiary amino group. See U. S. Patent No. 2,520,093, dated August 22, 1950, to Groll.

For purpose of convenience, what has been said by direct reference is largely by way of illustration in which there is present a sizable hydrophobe group, for instance, heptadecyl groups, pentadecyl groups, octyl groups, nonyl groups, etc., etc.

As has been pointed out, one can obtain all these comparable derivatives from low molal acids, such as acetic, propionic, butyric, valeric, etc. Similarly, one can employ hydroxy acids such as glycolic acids, lactic acid, etc. Over and above this, one may employ acids which introduce a very distinct hydrophobe effect as, for example, acids prepared by the oxyethylation of a low molal alcohol, such as methyl, ethyl, propyl, or the like, to produce compounds of the formula R(OCH₂CH₂)$_n$OH in which R is a low molal group, such as methyl, ethyl or propyl, and $n$ is a whole number varying from one up to 15 or 20. Such compounds can be converted into the alkoxide and then reacted with an ester of chloracetic, followed by saponification so as to yield compounds of the type R(OCH₂CH₂)$_n$OCH₂COOH in which $n$ has its prior significance. Another procedure is to convert the compound into a halide ether such as in R(OCH₂CH₂)$_n$Cl in which $n$ has its prior significance, and then react such halide ether with sodium cyanide so as to give the corresponding nitrile R(OCH₃CH₃)$_n$CN, which can be converted into the corresponding acid, of the following composition R(OCH₂CH₂)$_n$COOH. Such acids can also be used to produce acyl derivatives of the kind previously described in which acetic acid is used as an acylating agent.

What has been said above is intended to emphasize the fact that the nitrogen compounds herein employed can vary from those which are strongly hydrophobe in character and have a minimum hydrophobe property.

Examples of decreased hydrophobe character are exemplified by 2-methylimidazoline, 2-propylimidazoline, and 2-butylimidazoline, of the following structures:

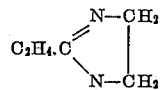 (17)

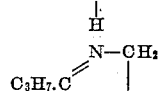 (18)

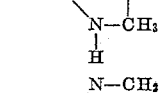 (19)

PART 4

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557, in order to obtain a heat-reactive resin. Since the condensation products obtained are not heat-convertible and since manufacture is not restricted to a single phase system, and since temperatures up to 150° C. or therabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, we have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether or ethyleneglycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, para-formaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of the most economical solvents and also on three other factors, two of which have been previously mentioned; (a) is the solvent to remain in the reaction mass without removal? (b) is the reaction mass to be subjected to further reaction in which the solvent, for instance, an alcohol, either low boiling or high boiling, might interfere as in the case of oxyalkylation? and the third factor is this, (c) is an effort to be made to purify the reaction mass by the usual procedure as, for example, a water-wash to remove the water-soluble unreacted formaldehyde, if any, or a water-wash to remove any unreacted water-soluble polyamine, if employed and present after reaction? Such procedures are well known and, needless to say, certain solvents are more suitable than others. Everything else being equal, we have found xylene the most satisfactory solvent.

We have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. We have not found any case where it was necessary or even desirable to hold the low temperature stage for more than 24 hours. In fact, we are not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature so as to use up part of the formaldehyde at such lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the polyamine is added and stirred. Depending on the polyamine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example 35° C. or slightly lower, provided this initial low temperature stage is employed. The formaldehyde is then added in a suitable form. For reasons pointed out we prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming takes place, and other mechanical or chemical difficulties are involved. We have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C. for 4 or 5 hours, or at the most, up to 10–24 hours, we then complete the reaction by raising the temperature up to 150° C., or thereabouts as required. The initial low temperature procedure can be eliminated or reduced to merely the shortest period of time which avoids loss of polyamine or formaldehyde. At a higher temperature we use a phase-separating trap and subject the mixture to reflux condensation until the water of reaction and the water of solution of the formaldehyde is eliminated. We then permit the temperature to rise to somewhere about 100° C., and generally slightly above 100° C., and below 150° C. by eliminating the solvent or part of the solvent so the reaction mass stays within this predetermined range. This period of heating and refluxing, after the water is eliminated, is continued until the reaction mass is homogeneous and then for one to three hours longer. The removal of the solvent is conducted in a conventional manner in the same way as the removal of solvents in resin manufacture as described in aforementioned U. S. Patent No. 2,499,368.

Needless to say, as far as the ratio of reactants goes we have invariably employed approximately one mole of the resin based on the molecular weight of the resin molecule, 2 moles of the secondary polyamine and 2 moles of formaldehyde. In some instances we have added a trace of caustic as an added catalyst but have found no particular advantage in this. In other cases we have used a slight excess of formaldehyde and, again, have not found any particular advantage in this. In other cases we have used a slight excess of nitrogen compound, and, again, have not found any particular advantage in so doing. Whenever feasible we have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted polyamine, if any is present, is another index.

In light of what has been said previously, little more need be said as to the actual procedure employed for the preparation of the herein described condensation products. The following example will serve by way of illustration:

*Example 1b*

The phenol-aldehyde resin is the one that has been identified previously as Example 2a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei and 4 nuclei excluding the 2 external nuclei, or 5 and 6 overall nuclei. The resin so obtained in a neutral state had a light amber color.

882 grams of the resin identified as 2a, preceding, were powdered and mixed with a somewhat lesser amount of xylene, i. e., 600 grams. The mixture was refluxed until solution was complete. It was then adjusted to approximately 35° C. and 612 grams of 2-oleylimidazoline, previously shown in a structural formula as ring compound (3), were added. The mixture was stirred vigorously and formaldehyde added slowly. In this particular case the formaldehyde used was a 37% solution and 162 grams were added in approximately 3 hours. The mixture was stirred vigorously and kept within a range of approximately 40° to 44° C., for about 16½ hours. At the end of this time it was refluxed, using a phase-separating trap and a small amount of aqueous distillate withdrawn from time to time. The presence of unreacted formaldehyde was noted. Any unreacted formaldehyde seemed to disappear in approximately three hours after refluxing started. As soon as the odor of formaldehyde was no longer detectible the phase-separating trap was set so as to eliminate all the water of solution and reaction. After the water was eliminated part of the xylene was removed until the temperature reached approximately 148° C. The mass was kept at this higher temperature for 3 or 4 hours. During this time any additional water, which was probably water of reaction which had formed, was eliminated by means of the trap. The residual xylene was permitted to stay in the cogeneric mixture. A small amount of the sample was heated on a water bath to remove the excess xylene. The residual material was dark red in color and had the consistency of a thick sticky fluid or tacky resin. The overall reaction time was approximately 30 hours. In other examples it varied from as little as 24 hours up to approximately 38 hours. The time can be reduced by cutting the low temperature period to approximately 3 to 6 hours. Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table II.

TABLE II

| Ex. No. | Resin used | Amt., grs. | Amine used | Amt. of amine, grams | Strength of formaldehyde soln. and amt. | Solvent used and amt. | Reaction temp., °C. | Reaction time (hrs.) | Max. distill. temp., °C. |
|---|---|---|---|---|---|---|---|---|---|
| 1b | 2a | 882 | Amine 3 | 612 | 37%, 162 g | Xylene, 600 g | 20-25 | 30 | 148 |
| 2b | 5a | 480 | do | 306 | 37%, 81 g | Xylene, 450 g | 21-23 | 24 | 145 |
| 3b | 10a | 633 | do | 306 | do | Xylene, 600 g | 20-22 | 28 | 150 |
| 4b | 2a | 441 | Amine 4 | 281 | 30%, 100 g | Xylene, 400 g | 22-24 | 28 | 148 |
| 5b | 5a | 480 | do | 281 | do | Xylene, 450 g | 21-23 | 30 | 148 |
| 6b | 10a | 633 | do | 281 | 37%, 81 g | Xylene, 600 g | 21-25 | 26 | 146 |
| 7b | 2a | 441 | Amine 5 | 394 | do | Xylene, 400 g | 23-28 | 26 | 147 |
| 8b | 5a | 480 | do | 394 | do | Xylene, 450 g | 22-26 | 26 | 146 |
| 9b | 10a | 633 | do | 394 | do | Xylene, 600 g | 21-25 | 38 | 150 |
| 10b | 13a | 473 | Amine 13 | 379 | 30%, 100 g | Xylene, 450 g | 20-24 | 36 | 149 |
| 11b | 14a | 511 | do | 379 | do | Xylene, 500 g | 21-22 | 24 | 142 |
| 12b | 15a | 665 | do | 379 | do | Xylene, 650 g | 20-21 | 26 | 145 |
| 13b | 2a | 441 | Amine 16 | 395 | 38%, 81 g | Xylene, 425 g | 22-28 | 28 | 146 |
| 14b | 5a | 480 | do | 395 | 37%, 81 g | Xylene, 450 g | 23-30 | 27 | 150 |
| 15b | 9a | 595 | do | 395 | do | Xylene, 550 g | 20-24 | 29 | 147 |
| 16b | 2a | 441 | Amine 17 | 99 | do | Xylene, 440 g | 20-21 | 30 | 148 |
| 17b | 5a | 480 | do | 99 | do | Xylene, 480 g | 21-26 | 32 | 146 |
| 18b | 14a | 511 | do | 99 | do | Xylene, 600 g | 21-23 | 26 | 147 |
| 19b | 22a | 498 | Amine 18 | 113 | do | Xylene, 500 g | 21-32 | 29 | 150 |
| 20b | 23a | 542 | do | 113 | do | do | 21-30 | 32 | 150 |
| 21b | 25a | 547 | do | 113 | do | Xylene, 550 g | 21-23 | 37 | 150 |
| 22b | 2a | 441 | Amine 19 | 126 | do | Xylene, 440 g | 20-23 | 30 | 150 |
| 23b | 26a | 595 | do | 126 | do | Xylene, 600 g | 20-25 | 36 | 149 |
| 24b | 27a | 391 | do | 126 | 30%, 50 g | Xylene, 400 g | 20-24 | 32 | 152 |

The amine numbers referred to are the ring compounds identified previously by number in Part 3.

PART 5

Cognizance should be taken of one particular feature in connection with the reaction involving the polyepoxide and the amine condensate and that is this; the amine-modified phenol-aldehyde resin condensate is invariably basic and thus one need not add the usual catalysts which are used to promote such reactions. Generally speaking, the reaction will proceed at a satisfactory rate under suitable conditions without any catalyst at all.

Employing polyepoxides in combination with a non-basic reactant the usual catalysts include alkaline materials such as caustic soda, caustic potash, sodium methylate, etc. Other catalyst may be acidic in nature and are of the kind characterized by iron and tin chloride. Furthermore, insoluble catalyst such as clays or specially prepared mineral catalysts have been used. If for any reason the reaction did not proceed rapidly enough with the diglycidyl ether or other analogous reactant, then a small amount of finely divided caustic soda or sodium methylate could be employed as a catalyst. The amount generally employed would be 1% or 2%.

It goes without saying that the reaction can take place in an inert solvent, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The selection of the solvent depends in part on the subsequent use of the derivatives or reaction products. If the reaction products are to be rendered solvent-free and it is necessary that the solvent be readily removed as, for example, by the use of vacuum distillation, thus xylene or an aromatic petroleum will serve.

*Example 1c*

The product was obtained by reaction between the diepoxide previously designated as diepoxide A, and condensate 2b. Condensate 2b was derived from resin 5a. Resin 5a, in turn, was obtained from tertiary amylphenol and formaldehyde. Condensate 2b employed as reactants resin 5a and diethanolamine. The amount of resin employed was 480 grams; the amount of diethanolamine employed was 105 grams, and the amount of 37% formaldehyde employed was 81 grams. The amount of solvent (xylene) employed was 450 grams. All this has been described previously.

The solution of the condensate in xylene was adjusted to a 50% solution. In this particular instance, and in practically all the others which appear in the subsequent tables, the examples are characterized by the fact that no alkaline catalyst was added. The reason is, of course, that the condensate as such is strongly basic. If desired, a small amount of an alkaline catalyst could be added, such as finely powdered caustic soda, sodium methylate, etc. If such alkaline catalyst is added it may speed up the reaction, but it may also cause an undesirable reaction, such as the polymerization of the diepoxide.

In any event, 160 grams of the condensate dissolved in an equal weight of xylene were stirred and heated to about 107° C. 18.5 grams of the diepoxide previously identified as diepoxide A, and dissolved in an equal weight of xylene, were added dropwise. The initial addition of the xylene solution carried the temperature to about 107° C. The remainder of the diepoxide was added during approximately an hour's time. During this period of time the reflux temperature rose to about 126° C. The product was allowed to reflux at about 130° C. using a phase-separating trap. A small amount of xylene was removed by means of the phase-separating trap so that the refluxing temperature rose gradually to a maximum of 160° C. The mixture was refluxed at 160° C. for approximately 4½ hours. Experience has indicated that this period of time was sufficient to complete the reaction.

At the end of the period the xylene which had been removed during the reflux period was returned to the mixture. A small amount of material was withdrawn and the xylene evaporated on a hot plate in order to examine physical properties. The material was a dark red viscous semi-solid. It was insoluble in water, it was insoluble in 5% gluconic acid, and it was soluble in xylene, and particularly in a mixture of 80% xylene and 20% methanol. However, if the material was dissolved in an oxygenated solvent and then shaken with 5% gluconic acid it showed a definite tendency to disperse, suspend, or form a sol, and particularly in a xylene-methanol mixed solvent as previously described, with or without the further addition of a little acetone.

The procedure employed of course is simple in light of what has been said previously and in effect is a procedure similar to that employed in the use of glycide or methylglycide as oxyalkylating agents. See, for example, Part 1 of U. S. Patent No. 2,602,062 dated July 1, 1952, to De Groote.

Various examples obtained in substantially the same manner are enumerated in the following tables:

TABLE III

| Ex. No. | Condensate used | Amt., grs. | Diepoxide used | Amt., grs. | Xylene, grs. | Molar ratio | Time of reaction, hrs. | Max. temp., °C. | Color and physical state |
|---|---|---|---|---|---|---|---|---|---|
| 1c | 2b | 160 | A | 18.5 | 178.5 | 2:1 | 5 | 160 | Dark resinous mass. |
| 2c | 5b | 155 | A | 18.5 | 173.5 | 2:1 | 5 | 162 | Do. |
| 3c | 7b | 169 | A | 18.5 | 187.5 | 2:1 | 5 | 158 | Do. |
| 4c | 8b | 177 | A | 18.5 | 105.5 | 2:1 | 6 | 165 | Do. |
| 5c | 10b | 173 | A | 18.5 | 191.5 | 2:1 | 6 | 170 | Do. |
| 6c | 12b | 211 | A | 18.5 | 229.5 | 2:1 | 6 | 164 | Do. |
| 7c | 13b | 170 | A | 18.5 | 188.5 | 2:1 | 5 | 168 | Do. |
| 8c | 18b | 124 | A | 18.5 | 142.5 | 2:1 | 5 | 158 | Do. |
| 9c | 19b | 125 | A | 18.5 | 143.5 | 2:1 | 5 | 162 | Do. |
| 10c | 20b | 131 | A | 18.5 | 149.5 | 2:1 | 5 | 160 | Do. |

TABLE IV

| Ex. No. | Condensate used | Amt., grs. | Diepoxide used | Amt., grs. | Xylene, grs. | Molar ratio | Time of reaction, hrs. | Max. temp., °C. | Color and physical state |
|---|---|---|---|---|---|---|---|---|---|
| 1d | 2b | 160 | B | 11 | 171 | 2:1 | 6 | 162 | Dark resinous mass. |
| 2d | 5b | 155 | B | 11 | 166 | 2:1 | 6 | 165 | Do. |
| 3d | 7b | 169 | B | 11 | 180 | 2:1 | 6 | 168 | Do. |
| 4d | 8b | 177 | B | 11 | 188 | 2:1 | 6 | 160 | Do. |
| 5d | 10b | 173 | B | 11 | 184 | 2:1 | 6 | 165 | Do. |
| 6d | 12b | 211 | B | 11 | 222 | 2:1 | 6 | 168 | Do. |
| 7d | 13b | 170 | B | 11 | 181 | 2:1 | 6 | 158 | Do. |
| 8d | 18b | 124 | B | 11 | 135 | 2:1 | 5 | 160 | Do. |
| 9d | 19b | 125 | B | 11 | 136 | 2:1 | 5 | 162 | Do. |
| 10d | 20b | 131 | B | 11 | 142 | 2:1 | 5 | 165 | Do. |

Solubility in regard to all these compounds was substantially similar to that which was described in Example 1c.

TABLE V

| Ex. No. | Resin condensate used | Probable mol. wt. of reaction product | Amt. of product, grs. | Amt. of solvent, grs. | Probable number of hydroxyls per molecule |
|---|---|---|---|---|---|
| 1c | 2b | 3,570 | 3,570 | 1,285 | 13 |
| 2c | 5b | 3,470 | 3,476 | 1,741 | 13 |
| 3c | 7b | 3,750 | 3,745 | 1,870 | 13 |
| 4c | 8b | 3,910 | 3,910 | 1,955 | 13 |
| 5c | 10b | 3,830 | 3,830 | 1,915 | 13 |
| 6c | 12b | 4,590 | 4,595 | 2,300 | 13 |
| 7c | 13b | 3,770 | 3,770 | 1,885 | 17 |
| 8c | 18b | 2,850 | 2,850 | 1,425 | 13 |
| 9c | 19b | 2,870 | 2,870 | 1,435 | 14 |
| 10c | 20b | 2,990 | 2,995 | 1,500 | 14 |

TABLE VI

| Ex. No. | Resin condensate used | Probable mol. wt. of reaction product | Amt. of product, grs. | Amt. of solvent, grs. | Probable number of hydroxyls per molecule |
|---|---|---|---|---|---|
| 1d | 2b | 3,420 | 3,425 | 1,715 | 11 |
| 2d | 5b | 3,320 | 3,320 | 1,660 | 11 |
| 3d | 7b | 3,600 | 3,600 | 1,800 | 11 |
| 4d | 8b | 3,760 | 3,760 | 1,880 | 11 |
| 5d | 10b | 3,680 | 3,675 | 1,835 | 11 |
| 6d | 12b | 4,440 | 4,440 | 2,220 | 11 |
| 7d | 13b | 3,620 | 3,620 | 1,810 | 15 |
| 8d | 18b | 2,700 | 2,700 | 1,350 | 11 |
| 9d | 19b | 2,720 | 2,720 | 1,360 | 12 |
| 10d | 20b | 2,840 | 2,840 | 1,420 | 12 |

At times we have found a tendency for an insoluble mass to form or at least to obtain incipient cross-linking or gelling even when the molal ratio is in the order of 2 moles of resin to one of diepoxide. We have found this can be avoided by any one of the following procedures or their equivalent. Dilute the resin or the diepoxide, or both, with an inert solvent, such as xylene or the like. In some instances an oxygenated solvent such as the diethyl ether of ethyleneglycol may be employed. Another procedure which is helpful is to reduce the amount of catalyst used, or reduce the temperature of reaction by adding a small amount of initially lower boiling solvent such as benzene, or use benzene entirely. Also, we have found it desirable at times to use slightly less than apparently the theoretical amount of diepoxide, for instance 90% or 95% instead of 100%. The reason for this fact may reside in the possibility that the molecular weight dimensions on either the resin molecule or the diepoxide molecule may actually vary from the true molecular weight by several percent.

Previously the condensate has been depicted in a simplified form which, for convenience, may be shown thus:

Following such simplification the reaction product with a polyepoxide and particularly a diepoxide, would be indicated thus:

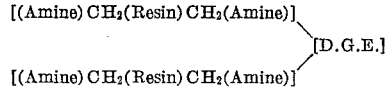

in which D. G. E. represents a diglycidyl ether as specified. If the amine happened to have more than one reactive hydrogen, as in the case of a hydroxylated amine or polyamine, having a multiplicity of secondary amino groups it is obvious that other side reactions could take place as indicated by the following formulas:

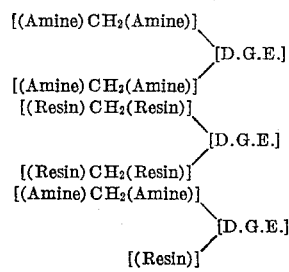

All the above indicates the complexity of the reaction product obtained after treating the amine-modified resin condensate with a polyepoxide and particularly diepoxide as herein described.

PART 6

The preparation of the compounds or products described in Part 5, preceding, involves an oxyalkylating agent, to wit, a polyepoxide and usually a diepoxide. The procedure described in the present part is a further oxyalkylation step but involves the use of a monoepoxide or the equivalent. The principal difference is only that while polyepoxides are invariably nonvolatile and can be reacted under a condenser, at least numerous monoepoxides and particularly ethylene oxide, propylene oxide, butylene oxide, etc., involve somewhat different operating conditions. Glycide and methylglycide react under practically the same conditions as the polyepoxides. Actually, for purpose of convenience, it is most desirable to conduct the previous reaction, i. e., the one involving the polyepoxide, in equipment such that subsequent reaction with monoepoxides may follow without interruption.

Although ethylene oxide and propylene oxide may represent less of a hazard than glycide, yet these reactants should be handled with extreme care. One suitable procedure involves the use of propylene oxide or butylene oxide as a solvent as well as a reactant in the earlier stages along with ethylene oxide, for instance, by dissolving the appropriate resin condensate in propylene oxide even though oxyalkylation is taking place to a greater or lesser degree. After a solution has been obtained which represents the selected resin condensate dissolved in propylene oxide or butylene oxide, or a mixture which includes the oxyalkylated product, ethylene oxide is added to react with the liquid mass until hydrophile properties are obtained, if not previously present to the desired degree. Indeed, hydrophile character can be reduced or balanced by use of some other oxide, such as propylene oxide or butylene oxide. Since ethylene oxide is more reactive than propylene oxide or butylene oxide, the final product may contain some unreacted propylene oxide or butylene oxide which can be eliminated by volatilization or distillation in any suitable manner. See article entitled "Ethylene oxide hazards and methods of handling," Industrial and Engineering Chemistry, volume 42, No. 6, June 1950, pp. 1251-1258. Other procedures can be employed as, for example, that described in U. S. Patent No. 2,586,767, dated February 19, 1952, to Wilson.

The amount of monoepoxides employed may be as high as 50 parts of monoepoxide for one part of monoepoxide treated amine-modified phenol-aldehyde condensation product.

Example 1D

The polyepoxide-derived oxyalkylation-susceptible compound is the one previously designated as 1c. Polyepoxide-derived condensate 1c was obtained, in turn, from condensation 2b and diepoxide A. Reference to Table II shows the composition of condensate 2b. Table II shows it was obtained from resin 5a, amine 3 and formaldehyde. Amine 3 was 2-oleylimidazoline. Table I shows that resin 5a was obtained from tertiary amylphenol and formaldehyde.

For the purpose of convenience, reference herein and in the tables to the oxyalkylation-susceptible compound will be abbreviated in the table heading as "OSC"; reference is to the solvent-free material since, for convenience, the amount of solvent is noted in a second column. Actually, part of the solvent may have been present and in practically every case was present in either the resinification process or the condensation process, or in treatment with a polyepoxide. In any event, the amount of solvent present at the time of treatment with a monoepoxide is indicated, as stated, on a solvent-free basis.

17.85 pounds of the polyepoxide-derived condensate were mixed with 17.85 pounds of solvent (xylene in this series), along with one pound of finely powdered caustic soda as a catalyst. The reaction mixture was treated with 4.50 pounds of ethylene oxide. At the end of the reaction period the molal ratio of oxide to initial compound was approximately 20.5 to one, and the theoretical molecular weight was approximately 4500.

Adjustment was made in the autoclave to operate at a temperature of about 125° C. to 130° C., and at a pressure of 10 to 15 pounds per square inch.

The time regulator was set so as to inject the oxide in approximately ½ hour and then continue stirring for a half-hour longer, simply as a precaution to insure complete reaction. The reaction went readily and, as a matter of fact, the ethylene oxide probably could have been injected in 15 minutes instead of an hour and the subsequent time allowed to insure completion of reaction may have been entirely unnecessary. The speed of reaction, particularly at low pressure, undoubtedly was due in a large measure to the excellent agitation and also to the comparatively high concentration of catalyst.

A comparatively small sample, less than 50 grams, was withdrawn merely for examination as far as solubility or emulsifying power was concerned, and also for the purpose of making some tests on various oil field emulsions. The amount withdrawn was so small that no cognizance of this fact is included in the data or subsequent data, or in data reported in tabular form in subsequent Tables VII, VIII and IX.

The size of the autoclave employed was 35 gallons. In innumerable oxyalkylations we have withdrawn a substantial portion at the end of each step and continued oxyalkylation on a partial residual sample. This was not the case in this particular series. Certain examples were duplicated as hereinafter noted and subjected to oxyalkylation with a different oxide.

*Example 2D*

This simply illustrates further oxyalkylation of Example 1D, preceding. The oxyalkylation-susceptible compound 1c is the same as the one used in Example 1D, preceding, because it is merely a continuation. In subsequent tables, such as Table VII, the oxyalkylation-susceptible compound in the horizontal line concerned with Example 2D refers to oxyalkylation-susceptible compound 1c. Actually, one could refer just as properly to Example 1D at this stage. It is immaterial which designation is used so long as it is understood such practice is used consistently throughout the tables. In any event, the amount of ethylene oxide introduced was less than previously, to wit, only 4.5 pounds. This meant the amount of oxide at the end of the stage was 9.0 pounds, and the ratio of oxide to oxyalkylation-susceptible compound (molar basis) at the end was 41.0 to 1. The theoretical molecular weight was 5370. There was no added solvent. In other words, it remained the same, that is, 17.85 pounds and there was no added catalyst. The entire procedure was substantially the same as in Example 1D, preceding.

In this, and in all succeeding examples, the time and pressure were the same as previously, to wit, 125° to 130° C., and the pressure 10 to 15 pounds. The time element was only one-half because considerably less oxide was added.

*Example 3D*

The oxyalkylation proceeded in the same manner as in Examples 1D and 2D. There was no added solvent and no added catalyst. The amount of oxide added was 4.5 pounds. The total amount of oxide at the end of the stage was 13.5 pounds. The molal ratio of oxide to condensate was 61.35 to 1. The theoretical molecular weight was approximately 6270, and as previously noted the temperature and pressure were the same as in preceding Example 2D, but the time period was 45 minutes.

*Example 4D*

The oxyalkylation was continued and the amount of oxide added was the same as before, to wit, 4.5 pounds. The amount of oxide added at the end of the reaction was 18.0 pounds. There was no added solvent and no added catalyst. Conditions as far as temperature and pressure are concerned were the same as in previous examples. The time period was the same as before, 45 minutes. The reaction at this point showed modest, if any, tendency to slow up. The molal ratio of oxide to oxyalkylation-susceptible compound was 82.0 to 1. The theoretical molecular weight was 720°.

*Example 5D*

The oxyalkylation was continued with the introduction of 18 pounds of oxide. No added solvent was introduced and likewise no added catalyst was introduced. The theoretical molecular weight at the end of the reaction was approximately 10,800. The molal ratio of oxide to oxyalkylation-susceptible compound was 163.6 to 1. The time period was increased considerably, to 2½ hours.

*Example 6D*

The same procedure was followed as in the previous examples without the addition of either more catalyst or more solvent. The amount of oxide added, 36 pounds. The amount of oxide at the end of the reaction was 72 pounds. The time required to complete the reaction was slightly more than previously, to wit, 3 hours. At the end of the reaction period the ratio of oxide to oxyalkylation-susceptible compound was 327 to 1, and the theoretical molecular weight was 18,000.

The same procedure as described in the previous examples was employed in connection with a number of the other condensations described previously. All these data have been presented in tabular form in Tables VII through XII.

In substantially every case a 35-gallon autoclave, was employed, although in some instances the initial oxyethylation was started in a 15-gallon autoclave and then transferred to a 25-gallon autoclave, or at times to the 35-gallon autoclave. This is immaterial but happened to be a matter of convenience only. The solvent used in all cases was xylene. The catalyst used was finely powdered caustic soda.

Referring to Tables VII, VIII and IX, it will be noted that compounds 1D through 18D were obtained by the use of ethylene oxide, whereas Examples 19D through 36D were obtained by the use of propylene oxide; and Examples 37D through 54D were obtained by the use of butylene oxide.

Referring now to Table VIII specifically, it will be noted that the series of examples beginning with 1E were obtained, in turn, by use of both ethylene and propylene oxides, using ethylene first; in fact, using Example 5D as the oxyalkylation-susceptible compound. This applies to series 1E through 18E.

Similarly, series 19E through 36E involve the use of both propylene oxide and ethylene oxide in which the propylene oxide was used first, to wit, 19E was prepared from 24D, a compound which was initially derived by use of propylene oxide.

Similarly, Examples 37E through 54E involve the use of ethylene oxide and butylene oxide, the ethylene oxide being used first. Also, these two oxides were used in the series 55E through 72E, but in this latter instance the butylene oxide was used first and then the ethylene oxide.

Series 73E through 90E involve the use of propylene oxide and butylene oxide, butylene oxide being used first and propylene oxide being used next.

In series 1F through 18F the three oxides were used. It will be noted in Example 1F the initial compound was 77E. Example 77E, in turn, was obtained from a compound in which butylene oxide was used initially and then propylene oxide. Thus, the oxide added in the series 1F through 6F was by use of ethylene oxide as indicated in Table IX.

Referring to Table IX, in regard to Example 19F it will be noted again that the three oxides were used and 19F was obtained from 60E. Example 60E, in turn, was obtained by using butylene oxide first and then ethylene oxide. In Example 19F and subsequent examples, such as 20F, 21F, etc., propylene oxide was added.

Tables X, XI and XII give the data in regard to the oxyalkylation procedure as far as temperature and pressure are concerned and also give some data as to solubility of the oxyalkylated derivative in water xylene and kerosene.

Referring to Table XII in greater detail, the data are as follows: The first column gives the example numbers, such as 1D, 2D, 3D, etc. etc.; the second column gives the oxalkylation-susceptible compound employed which, as previously noted in the series 1D through 6D, is Example 1c, although it would be just as proper to say that in the case of 2D the oxyalkylation-susceptible compound was 1D, and in the case of 3D the oxyalkylation-susceptible compound was 2D. Actually, reference is to the parent derivative for the reason that the figure stands constant and probably leads to a more convenient presentation. Thus, the third column indicates the epoxide-derived condensate previously referred to.

The fourth column shows the amount of ethylene oxide in the mixture prior to the particular oxyethylation step. In the case of Example 1D there is no oxide used but it appears, of course, in 2D, 3D, and 4D, etc.

The fifth column can be ignored for the reason that it is concerned with propylene oxide only, and the sixth column can be ignored for the reason that it is concerned with butylene oxide only.

The seventh column shows the catalyst which is invariably powdered caustic soda.

The eighth column shows the amount of solvent which is xylene unless otherwise stated.

The ninth column shows the oxyalkylation-susceptible compound which in this series is the polyepoxide-derived condensate.

The tenth column shows the amount of ethylene oxide in at the end of the particular step.

Column eleven shows the same data for propylene oxide and column twelve shows data for butylene oxide. For obvious reason these can be ignored in the series 1D through 18D.

Column thirteen shows the amount of the catalyst at the end of the oxyalkylation step, and column fourteen shows the solvent at the end of the oxyalkylation step.

The fifteenth, sixteenth and seventeenth columns are concerned with molal ratio of the individual oxides to the oxyalkylation-susceptible compound. Data appears only in column fifteen for the reason, previously noted, that no butylene or propylene oxide were used in the present instance.

The theoretical molecular weight appears at the end of the table which is on the assumption, as previously noted, as to the probable molecular weight of the initial compound, and on the assumption that all oxide added during the period combined. This is susceptible to limitations that have been pointed out elsewhere, particularly in the patent literature.

Referring now to the second series of compounds in Table VII, to wit, Examples 19D through 36D, the situation is the same except that it is obvious that the oxalkylating agent used was propylene oxide and not ethylene oxide. Thus, the fourth column becomes a blank and the tenth column becomes a blank and the fifteenth column becomes a blank, but column five, which previously was a blank in Table VII, Examples 1D through 18D, now carries data as to the amount of propylene oxide present at the beginning of the reaction. Column eleven carries data as to the amount of propylene oxide present at the end of the reaction, and column sixteen carries data as to the ratio of propylene oxide to the oxyalkylation-susceptible compound. In all other instances the various headings have the same significance as previously.

Similarly, referring to Examples 37D through 54D in Table VII, columns four and five are blanks, columns ten and eleven are blanks, and columns fifteen and sixteen are blanks, but data appear in column six as to butylene oxide present before the particular oxyalkylation step. Column twelve gives the amount of butylene oxide present at the end of the step, and column seventeen gives the ratio of butylene oxide to oxyalkylation-susceptible compound.

Table VIII is in essence the data presented in exactly the same way except the two oxides appear, to wit, ethylene oxide and propylene oxide. This means that there are only three columns in which data does not appear, all three being concerned with the use of butylene oxide. Furthermore, it shows which oxide was used first by the very fact that reference to Example 1E, in turn, refers to 5D, and also shows that ethylene oxide was present at the very first stage. Furthermore, for ease of comparison and also to be consistent, the data under Molal Ratio in regard to ethylene oxide and propylene oxide goes back to the original diepoxide-derived condensate 1c. This is obvious, of course, because the figures 163.6 and 61.6 coincide with the figures for 2D derived from 1c as shown in Table VII.

In Table VIII (Examples 19E through 36E) the same situation is involved except, of course, propylene oxide is used first and this, again, is perfectly apparent. Three columns only are blank, to wit, the three referring to butylene oxide. The same situation applies in examples such as 37E and subsequent examples where the two oxides used are ethylene oxide and butylene oxide, and the table makes it plain that ethylene oxide was used first. Inversely, Example 55E and subsequent examples show the use of same two oxides but with butylene oxide being used first as shown on the table.

Example 73E and subsequent examples relate to the use of propylene oxide and butylene oxide. Examples beginning with 1F, Table IX, particularly 2F, 3F, etc., show the use of all three oxides so there are no blanks as in the first step of each stage where one oxide is missing. It is not believed any further explanation need be offered in regard to Table IX.

As previously pointed out certain initial runs using one oxide only, or in some instances two oxides, had to be duplicated when used subsequently for further reaction. It would be confusing to refer to too much detail in these various tables for the reason that all the data appear in considerable detail and is such that all results can be readily shown.

Reference to solvent and amount of alkali at any point takes into consideration the solvent from the previous step and the alkali left from this step. As previously pointed out, Tables X, XI and XII give operating data in connection with the entire series, comparable to what has been said in regard to Examples 1D through 6D.

The products resulting from these procedures may contain modest amounts, or have small amounts, of the solvents as indicated by the figures in the tables. If desired, the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., not attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides, just mentioned, or a combination of both of them.

The same would be true in regard to a mixture of ethylene oxide and butylene oxide, or butylene oxide and propylene oxide.

The colors of the products usually vary from a reddish amber tint to a definitely red, and amber, or a straw color, or even a pale straw color. The reason is primarily that no effort is made to obtain colorless resins initially and the resins themselves may be yellow, amber, or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color of the product. Products can be prepared in which the final color is a lighter amber with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. Since the products per se are alkaline due to the presence of a basic nitrogen, the removal of the alkaline catalyst is somewhat more difficult than ordinarily is the case for the reason that if one adds hydrochloric acid, for example, to neutralize the alkalinity one may partially neutralize the basic nitrogen radical also. The preferred procedure is to ignore the presence of the alkali unless it is objectionable or else add a stoichiometric amount of concentrated hydrochloric acid equal to the caustic soda present.

TABLE VII

| Ex. No. | OSC, ex. No. | Composition before | | | | | | Composition at end | | | | | | Molal ratio | | | Theo. mol. wt. |
|---|---|---|---|---|---|---|---|---|---|---|---|---|---|---|---|---|---|
| | | OSC, lbs. | Oxides | | | Catalyst, lbs. | Solvent, lbs. | OSC, lbs. | Oxides | | | Catalyst, lbs. | Solvent, lbs. | EtO to oxyalkyl. suscept. cmpd. | PrO to oxyalkyl. suscept. cmpd. | BuO to oxyalkyl. suscept. cmpd. | |
| | | | EtO, lbs. | PrO, lbs. | BuO, lbs. | | | | EtO, lbs. | PrO, lbs. | BuO, lbs. | | | | | | |
| 1D | 1c | 17.85 | | | | 1.0 | 17.85 | 17.85 | 4.5 | | | 1.0 | 17.85 | 20.45 | | | 4,470 |
| 2D | 1c | 17.85 | 4.5 | | | 1.0 | 17.85 | 17.85 | 9.0 | | | 1.0 | 17.85 | 40.9 | | | 5,370 |
| 3D | 1c | 17.85 | 9.0 | | | 1.0 | 17.85 | 17.85 | 13.5 | | | 1.0 | 17.85 | 61.35 | | | 6,270 |
| 4D | 1c | 17.85 | 13.5 | | | 1.0 | 17.85 | 17.85 | 18.0 | | | 1.0 | 17.85 | 81.8 | | | 7,170 |
| 5D | 1c | 17.85 | 18.0 | | | 1.0 | 17.85 | 17.85 | 36.0 | | | 1.0 | 17.85 | 163.6 | | | 10,770 |
| 6D | 1c | 17.85 | 36.0 | | | 1.0 | 17.85 | 17.85 | 72.0 | | | 1.0 | 17.85 | 327.2 | | | 17,970 |
| 7D | 2c | 17.35 | | | | 1.0 | 17.41 | 17.35 | 8.75 | | | 1.0 | 17.41 | 39.8 | | | 5,220 |
| 8D | 2c | 17.35 | 8.75 | | | 1.0 | 17.41 | 17.35 | 17.5 | | | 1.0 | 17.41 | 79.6 | | | 6,970 |
| 9D | 2c | 17.35 | 17.50 | | | 1.0 | 17.41 | 17.35 | 26.25 | | | 1.0 | 17.41 | 119.4 | | | 8,720 |
| 10D | 2c | 17.35 | 26.25 | | | 1.0 | 17.41 | 17.35 | 35.0 | | | 1.0 | 17.41 | 159.2 | | | 10,470 |
| 11D | 2c | 17.35 | 35.0 | | | 1.0 | 17.41 | 17.35 | 52.5 | | | 1.0 | 17.41 | 238.8 | | | 13,970 |
| 12D | 2c | 17.35 | 52.5 | | | 1.0 | 17.41 | 17.35 | 70.0 | | | 1.0 | 17.41 | 318.4 | | | 17,470 |
| 13D | 3c | 18.75 | | | | 1.0 | 18.70 | 18.75 | 9.5 | | | 1.0 | 18.70 | 43.2 | | | 5,650 |
| 14D | 3c | 18.75 | 9.5 | | | 1.0 | 18.70 | 18.75 | 19.0 | | | 1.0 | 18.70 | 86.4 | | | 7,550 |
| 15D | 3c | 18.75 | 19.0 | | | 1.0 | 18.70 | 18.75 | 28.5 | | | 1.0 | 18.70 | 129.6 | | | 9,450 |
| 16D | 3c | 18.75 | 28.5 | | | 1.0 | 18.70 | 18.75 | 38.0 | | | 1.0 | 18.70 | 172.8 | | | 11,350 |
| 17D | 3c | 18.75 | 38.0 | | | 1.0 | 18.70 | 18.75 | 57.0 | | | 1.0 | 18.70 | 259.2 | | | 15,150 |
| 18D | 3c | 18.75 | 57.0 | | | 1.0 | 18.70 | 18.75 | 76.0 | | | 1.0 | 18.70 | 345.6 | | | 18,950 |
| 19D | 1c | 17.85 | | | | 1.5 | 17.85 | 17.85 | | 17.85 | | 1.5 | 17.85 | | 61.6 | | 7,140 |
| 20D | 1c | 17.85 | | 17.85 | | 1.5 | 17.85 | 17.85 | | 35.7 | | 1.5 | 17.85 | | 123.2 | | 10,710 |
| 21D | 1c | 17.85 | | 35.7 | | 1.5 | 17.85 | 17.85 | | 53.55 | | 1.5 | 17.85 | | 184.8 | | 14,280 |
| 22D | 1c | 17.85 | | 53.55 | | 1.5 | 17.85 | 17.85 | | 71.4 | | 1.5 | 17.85 | | 246.4 | | 17,850 |
| 23D | 1c | 17.85 | | 71.4 | | 1.5 | 17.85 | 17.85 | | 89.25 | | 1.5 | 17.85 | | 308.0 | | 21,420 |
| 24D | 1c | 17.85 | | 89.25 | | 1.5 | 17.85 | 17.85 | | 107.1 | | 1.5 | 17.85 | | 369.6 | | 24,990 |
| 25D | 2c | 17.35 | | | | 1.5 | 17.41 | 17.35 | | 17.35 | | 1.5 | 17.41 | | 59.8 | | 6,940 |
| 26D | 2c | 17.35 | | 17.35 | | 1.5 | 17.41 | 17.35 | | 34.70 | | 1.5 | 17.41 | | 119.6 | | 10,410 |
| 27D | 2c | 17.35 | | 34.70 | | 1.5 | 17.41 | 17.35 | | 52.05 | | 1.5 | 17.41 | | 179.4 | | 13,880 |
| 28D | 2c | 17.35 | | 52.05 | | 1.5 | 17.41 | 17.35 | | 69.4 | | 1.5 | 17.41 | | 239.2 | | 17,350 |
| 29D | 2c | 17.35 | | 69.4 | | 1.5 | 17.41 | 17.35 | | 86.75 | | 1.5 | 17.41 | | 299.0 | | 20,820 |
| 30D | 2c | 17.35 | | 86.75 | | 1.5 | 17.41 | 17.35 | | 104.1 | | 1.5 | 17.41 | | 358.8 | | 24,290 |
| 31D | 3c | 18.75 | | | | 1.5 | 18.70 | 18.75 | | 18.75 | | 1.5 | 18.70 | | 64.7 | | 4,500 |
| 32D | 3c | 18.75 | | 18.75 | | 1.5 | 18.70 | 18.75 | | 37.5 | | 1.5 | 18.70 | | 129.4 | | 11,250 |
| 33D | 3c | 18.75 | | 37.5 | | 1.5 | 18.70 | 18.75 | | 56.25 | | 1.5 | 18.70 | | 194.1 | | 15,000 |
| 34D | 3c | 18.75 | | 56.25 | | 1.5 | 18.70 | 18.75 | | 75.0 | | 1.5 | 18.70 | | 258.8 | | 18,750 |
| 35D | 3c | 18.75 | | 75.0 | | 1.5 | 18.70 | 18.75 | | 93.75 | | 1.5 | 18.70 | | 323.5 | | 22,500 |
| 36D | 3c | 18.75 | | 93.75 | | 1.5 | 18.70 | 18.75 | | 112.5 | | 1.5 | 18.70 | | 388.2 | | 26,250 |
| 37D | 1c | 17.85 | | | | 1.0 | 17.85 | 17.85 | | | 6.0 | 1.0 | 17.85 | | | 16.65 | 4,770 |
| 38D | 1c | 17.85 | | | 6.0 | 1.0 | 17.85 | 17.85 | | | 12.0 | 1.0 | 17.85 | | | 33.3 | 5,970 |
| 39D | 1c | 17.85 | | | 12.0 | 1.0 | 17.85 | 17.85 | | | 18.0 | 1.0 | 17.85 | | | 49.95 | 7,170 |
| 40D | 1c | 17.85 | | | 18.0 | 1.0 | 17.85 | 17.85 | | | 24.0 | 1.0 | 17.85 | | | 66.6 | 8,370 |
| 41D | 1c | 17.85 | | | 24.0 | 1.0 | 17.85 | 17.85 | | | 36.0 | 1.0 | 17.85 | | | 99.9 | 10,770 |
| 42D | 1c | 17.85 | | | 36.0 | 1.0 | 17.85 | 17.85 | | | 72.0 | 1.0 | 17.85 | | | 199.8 | 17,970 |
| 43D | 2c | 17.35 | | | | 1.0 | 17.41 | 17.35 | | | 4.25 | 1.0 | 17.41 | | | 11.8 | 4,320 |
| 44D | 2c | 17.35 | | | 4.25 | 1.0 | 17.41 | 17.35 | | | 8.50 | 1.0 | 17.41 | | | 23.6 | 5,170 |
| 45D | 2c | 17.35 | | | 8.50 | 1.0 | 17.41 | 17.35 | | | 17.0 | 1.0 | 17.41 | | | 47.2 | 6,870 |
| 46D | 2c | 17.35 | | | 17.0 | 1.0 | 17.41 | 17.35 | | | 34.0 | 1.0 | 17.41 | | | 94.4 | 10,270 |
| 47D | 2c | 17.35 | | | 34.0 | 1.0 | 17.41 | 17.35 | | | 42.5 | 1.0 | 17.41 | | | 118.0 | 11,970 |
| 48D | 2c | 17.35 | | | 42.5 | 1.0 | 17.41 | 17.35 | | | 68.0 | 1.0 | 17.41 | | | 188.8 | 14,520 |
| 49D | 3c | 18.75 | | | | 1.0 | 18.70 | 18.75 | | | 4.75 | 1.0 | 18.7 | | | 13.2 | 4,700 |
| 50D | 3c | 18.75 | | | 4.75 | 1.0 | 18.70 | 18.75 | | | 9.50 | 1.0 | 18.7 | | | 26.4 | 5,650 |
| 51D | 3c | 18.75 | | | 9.50 | 1.0 | 18.70 | 18.75 | | | 19.0 | 1.0 | 18.7 | | | 52.8 | 7,550 |
| 52D | 3c | 18.75 | | | 19.0 | 1.0 | 18.70 | 18.75 | | | 38.0 | 1.0 | 18.7 | | | 105.6 | 11,350 |
| 53D | 3c | 18.75 | | | 38.0 | 1.0 | 18.70 | 18.75 | | | 47.5 | 1.0 | 18.7 | | | 132.0 | 13,050 |
| 54D | 3c | 18.75 | | | 47.5 | 1.0 | 18.70 | 18.75 | | | 66.5 | 1.0 | 18.7 | | | 184.8 | 16,850 |

TABLE VIII

| Ex. No. | OSC, ex. No. | OSC, lbs. | Composition before ||||| Composition at end |||||  Molal ratio ||| Theo. mol. wt. |
|---|---|---|---|---|---|---|---|---|---|---|---|---|---|---|---|---|---|
| | | | Oxides ||| Catalyst, lbs. | Solvent, lbs. | OSC, lbs. | Oxides ||| Catalyst, lbs. | Solvent, lbs. | EtO to oxyalkyl. suscept. cmpd. | PrO to oxyalkyl. suscept. cmpd. | BuO to oxyalkyl. suscept. cmpd. | |
| | | | EtO, lbs. | PrO, lbs. | BuO, lbs. | | | | EtO, lbs. | PrO, lbs. | BuO, lbs. | | | | | | |
| 1E | 5D | 17.85 | 36.0 | | | 1.5 | 17.85 | 17.85 | 36.0 | 17.85 | | 1.5 | 17.85 | 163.6 | 61.6 | | 14,340 |
| 2E | 5D | 17.85 | 36.0 | 17.85 | | 1.5 | 17.85 | 17.85 | 36.0 | 35.7 | | 1.5 | 17.85 | 163.6 | 123.2 | | 17,910 |
| 3E | 5D | 17.85 | 36.0 | 35.7 | | 1.5 | 17.85 | 17.85 | 36.0 | 53.55 | | 1.5 | 17.85 | 163.6 | 184.8 | | 21,480 |
| 4E | 5D | 17.85 | 36.0 | 53.55 | | 1.5 | 17.85 | 17.85 | 36.0 | 71.4 | | 1.5 | 17.85 | 163.6 | 246.4 | | 25,050 |
| 5E | 5D | 17.85 | 36.0 | 71.4 | | 1.5 | 17.85 | 17.85 | 36.0 | 89.25 | | 1.5 | 17.85 | 163.6 | 308.0 | | 28,620 |
| 6E | 5D | 17.85 | 36.0 | 89.25 | | 1.5 | 17.85 | 17.85 | 36.0 | 107.1 | | 1.5 | 17.85 | 163.6 | 369.6 | | 32,190 |
| 7E | 9D | 17.35 | 26.25 | | | 1.5 | 17.41 | 17.35 | 26.25 | 17.35 | | 1.5 | 17.41 | 119.4 | 59.8 | | 12,190 |
| 8E | 9D | 17.35 | 26.25 | 17.35 | | 1.5 | 17.41 | 17.35 | 26.25 | 34.70 | | 1.5 | 17.41 | 119.4 | 119.6 | | 15,660 |
| 9E | 9D | 17.35 | 26.25 | 34.7 | | 1.5 | 17.41 | 17.35 | 26.25 | 52.05 | | 1.5 | 17.41 | 119.4 | 179.4 | | 19,130 |
| 10E | 9D | 17.35 | 26.25 | 52.05 | | 1.5 | 17.41 | 17.35 | 26.25 | 69.4 | | 1.5 | 17.41 | 119.4 | 239.2 | | 22,600 |
| 11E | 9D | 17.35 | 26.25 | 69.4 | | 1.5 | 17.41 | 17.35 | 26.25 | 86.75 | | 1.5 | 17.41 | 119.4 | 299.0 | | 26,070 |
| 12E | 9D | 17.35 | 26.25 | 86.75 | | 1.5 | 17.41 | 17.35 | 26.25 | 104.1 | | 1.5 | 17.41 | 119.4 | 358.8 | | 29,540 |
| 13E | 17D | 18.75 | 57.0 | | | 1.5 | 18.70 | 18.75 | 57.0 | 18.75 | | 1.5 | 18.70 | 259.2 | 64.7 | | 18,900 |
| 14E | 17D | 18.75 | 57.0 | 18.75 | | 1.5 | 18.70 | 18.75 | 57.0 | 37.5 | | 1.5 | 18.70 | 259.2 | 129.4 | | 22,650 |
| 15E | 17D | 18.75 | 57.0 | 37.5 | | 1.5 | 18.70 | 18.75 | 57.0 | 56.25 | | 1.5 | 18.70 | 259.2 | 194.1 | | 26,400 |
| 16E | 17D | 18.75 | 57.0 | 56.25 | | 1.5 | 18.70 | 18.75 | 57.0 | 75.0 | | 1.5 | 18.70 | 259.2 | 258.8 | | 30,150 |
| 17E | 17D | 18.75 | 57.0 | 75.0 | | 1.5 | 18.70 | 18.75 | 57.0 | 93.75 | | 1.5 | 18.70 | 259.2 | 323.5 | | 33,900 |
| 18E | 17D | 18.75 | 57.0 | 93.75 | | 1.5 | 18.70 | 18.75 | 57.0 | 112.5 | | 1.5 | 18.70 | 259.2 | 388.2 | | 37,650 |
| 19E | 24D | 17.85 | | 107.1 | | 1.5 | 17.85 | 17.85 | 4.5 | 107.1 | | 1.5 | 17.85 | 20.45 | 369.6 | | 25,890 |
| 20E | 24D | 17.85 | 4.5 | 107.1 | | 1.5 | 17.85 | 17.85 | 9.0 | 107.1 | | 1.5 | 17.85 | 40.9 | 369.6 | | 26,790 |
| 21E | 24D | 17.85 | 9.0 | 107.1 | | 1.5 | 17.85 | 17.85 | 13.5 | 107.1 | | 1.5 | 17.85 | 61.35 | 369.6 | | 27,690 |
| 22E | 24D | 17.85 | 13.5 | 107.1 | | 1.5 | 17.85 | 17.85 | 18.0 | 107.1 | | 1.5 | 17.85 | 81.8 | 369.6 | | 28,590 |
| 23E | 24D | 17.85 | 18.0 | 107.1 | | 1.5 | 17.85 | 17.85 | 27.0 | 107.1 | | 1.5 | 17.85 | 122.7 | 369.6 | | 30,390 |
| 24E | 24D | 17.85 | 27.0 | 107.1 | | 1.5 | 17.85 | 17.85 | 36.0 | 107.1 | | 1.5 | 17.85 | 163.6 | 369.6 | | 32,190 |
| 25E | 30D | 17.35 | | 104.1 | | 1.5 | 17.41 | 17.35 | 8.75 | 104.1 | | 1.5 | 17.41 | 39.8 | 358.8 | | 26,040 |
| 26E | 30D | 17.35 | 8.75 | 104.1 | | 1.5 | 17.41 | 17.35 | 17.50 | 104.1 | | 1.5 | 17.41 | 79.6 | 358.8 | | 27,790 |
| 27E | 30D | 17.35 | 17.50 | 104.1 | | 1.5 | 17.41 | 17.35 | 26.25 | 104.1 | | 1.5 | 17.41 | 119.4 | 358.8 | | 29,540 |
| 28E | 30D | 17.35 | 26.25 | 104.1 | | 1.5 | 17.41 | 17.35 | 35.0 | 104.1 | | 1.5 | 17.41 | 159.2 | 358.8 | | 31,290 |
| 29E | 30D | 17.35 | 35.0 | 104.1 | | 1.5 | 17.41 | 17.35 | 43.75 | 104.1 | | 1.5 | 17.41 | 199.0 | 358.8 | | 33,040 |
| 30E | 30D | 17.35 | 43.75 | 104.1 | | 1.5 | 17.41 | 17.35 | 52.5 | 104.1 | | 1.5 | 17.41 | 238.8 | 358.8 | | 34,790 |
| 31E | 36D | 18.75 | | 112.5 | | 1.5 | 18.70 | 18.75 | 4.75 | 112.5 | | 1.5 | 18.7 | 21.6 | 388.2 | | 27,200 |
| 32E | 36D | 18.75 | 4.75 | 112.5 | | 1.5 | 18.70 | 18.75 | 9.5 | 112.5 | | 1.5 | 18.7 | 43.2 | 388.2 | | 28,150 |
| 33E | 36D | 18.75 | 9.50 | 112.5 | | 1.5 | 18.70 | 18.75 | 14.25 | 112.5 | | 1.5 | 18.7 | 64.8 | 388.2 | | 29,100 |
| 34E | 36D | 18.75 | 14.25 | 112.5 | | 1.5 | 18.70 | 18.75 | 28.5 | 112.5 | | 1.5 | 18.7 | 129.6 | 388.2 | | 31,950 |
| 35E | 36D | 18.75 | 28.5 | 112.5 | | 1.5 | 18.70 | 18.75 | 38.0 | 112.5 | | 1.5 | 18.7 | 172.8 | 388.2 | | 33,850 |
| 36E | 36D | 18.75 | 38.0 | 112.5 | | 1.5 | 18.70 | 18.75 | 47.5 | 112.5 | | 1.5 | 18.7 | 216.0 | 388.2 | | 35,750 |
| 37E | 6D | 17.85 | 72.0 | | | 1.0 | 17.85 | 17.85 | 72.0 | | 6.0 | 1.0 | 17.85 | 327.2 | | 16.65 | 19,170 |
| 38E | 6D | 17.85 | 72.0 | | 6.0 | 1.0 | 17.85 | 17.85 | 72.0 | | 12.0 | 1.0 | 17.85 | 327.2 | 33.3 | | 20,370 |
| 39E | 6D | 17.85 | 72.0 | | 12.0 | 1.0 | 17.85 | 17.85 | 72.0 | | 18.0 | 1.0 | 17.85 | 327.2 | | 49.95 | 21,570 |
| 40E | 6D | 17.85 | 72.0 | | 18.0 | 1.0 | 17.85 | 17.85 | 72.0 | | 24.0 | 1.0 | 17.85 | 327.2 | | 66.6 | 22,770 |
| 41E | 6D | 17.85 | 72.0 | | 24.0 | 1.0 | 17.85 | 17.85 | 72.0 | | 36.0 | 1.0 | 17.85 | 327.2 | | 99.9 | 25,170 |
| 42E | 6D | 17.85 | 72.0 | | 36.0 | 1.0 | 17.85 | 17.85 | 72.0 | | 72.0 | 1.0 | 17.85 | 327.2 | | 199.8 | 32,370 |
| 43E | 11D | 17.35 | 52.5 | | | 1.0 | 17.41 | 17.35 | 52.5 | | 4.25 | 1.0 | 17.41 | 238.8 | | 11.8 | 14,820 |
| 44E | 11D | 17.35 | 52.5 | | 4.25 | 1.0 | 17.41 | 17.35 | 52.5 | | 8.50 | 1.0 | 17.41 | 238.8 | | 23.6 | 15,670 |
| 45E | 11D | 17.35 | 52.5 | | 8.50 | 1.0 | 17.41 | 17.35 | 52.5 | | 17.0 | 1.0 | 17.41 | 238.8 | | 47.2 | 17,370 |
| 46E | 11D | 17.35 | 52.5 | | 17.0 | 1.0 | 17.41 | 17.35 | 52.5 | | 34.0 | 1.0 | 17.41 | 238.8 | | 94.4 | 20,770 |
| 47E | 11D | 17.35 | 52.5 | | 34.0 | 1.0 | 17.41 | 17.35 | 52.5 | | 42.5 | 1.0 | 17.41 | 238.8 | | 118.0 | 22,470 |
| 48E | 11D | 17.35 | 52.5 | | 42.5 | 1.0 | 17.41 | 17.35 | 52.5 | | 68.0 | 1.0 | 17.41 | 238.8 | | 188.8 | 27,570 |
| 49E | 16D | 18.75 | 38.0 | | | 1.0 | 18.70 | 18.75 | 38.0 | | 4.75 | 1.0 | 18.70 | 172.8 | | 13.2 | 12,300 |
| 50E | 16D | 18.75 | 38.0 | | 4.75 | 1.0 | 18.70 | 18.75 | 38.0 | | 9.50 | 1.0 | 18.70 | 172.8 | | 26.4 | 13,250 |
| 51E | 16D | 18.75 | 38.0 | | 9.50 | 1.0 | 18.70 | 18.75 | 38.0 | | 19.0 | 1.0 | 18.70 | 172.8 | | 52.8 | 15,150 |
| 52E | 16D | 18.75 | 38.0 | | 19.0 | 1.0 | 18.70 | 18.75 | 38.0 | | 38.0 | 1.0 | 18.70 | 172.8 | | 105.6 | 18,950 |
| 53E | 16D | 18.75 | 38.0 | | 38.0 | 1.0 | 18.70 | 18.75 | 38.0 | | 47.5 | 1.0 | 18.70 | 172.8 | | 132.0 | 20,850 |
| 54E | 16D | 18.75 | 38.0 | | 47.5 | 1.0 | 18.70 | 18.75 | 38.0 | | 66.5 | 1.0 | 18.70 | 172.8 | | 184.8 | 24,650 |
| 55E | 40D | 17.85 | | | 24.0 | 1.0 | 17.85 | 17.85 | 4.5 | | 24.0 | 1.0 | 17.85 | 20.45 | | 66.6 | 9,270 |
| 56E | 40D | 17.85 | 4.5 | | 24.0 | 1.0 | 17.85 | 17.85 | 9.0 | | 24.0 | 1.0 | 17.85 | 40.9 | | 66.6 | 10,170 |
| 57E | 40D | 17.85 | 9.0 | | 24.0 | 1.0 | 17.85 | 17.85 | 13.5 | | 24.0 | 1.0 | 17.85 | 61.35 | | 66.6 | 11,070 |
| 58E | 40D | 17.85 | 13.5 | | 24.0 | 1.0 | 17.85 | 17.85 | 18.0 | | 24.0 | 1.0 | 17.85 | 81.8 | | 66.6 | 11,970 |
| 59E | 40D | 17.85 | 18.0 | | 24.0 | 1.0 | 17.85 | 17.85 | 27.0 | | 24.0 | 1.0 | 17.85 | 122.7 | | 66.6 | 13,770 |
| 60E | 40D | 17.85 | 27.0 | | 24.0 | 1.0 | 17.85 | 17.85 | 36.0 | | 24.0 | 1.0 | 17.85 | 163.6 | | 66.6 | 15,570 |
| 61E | 45D | 17.35 | | | 17.0 | 1.0 | 17.41 | 17.35 | 5.0 | | 17.0 | 1.0 | 17.41 | 22.7 | | 47.2 | 7,870 |
| 62E | 45D | 17.35 | 5.0 | | 17.0 | 1.0 | 17.41 | 17.35 | 8.75 | | 17.0 | 1.0 | 17.41 | 39.8 | | 47.2 | 8,620 |
| 63E | 45D | 17.35 | 8.75 | | 17.0 | 1.0 | 17.41 | 17.35 | 17.5 | | 17.0 | 1.0 | 17.41 | 79.6 | | 47.2 | 10,370 |
| 64E | 45D | 17.35 | 17.5 | | 17.0 | 1.0 | 17.41 | 17.35 | 26.25 | | 17.0 | 1.0 | 17.41 | 119.4 | | 47.2 | 12,120 |
| 65E | 45D | 17.35 | 26.25 | | 17.0 | 1.0 | 17.41 | 17.35 | 35.0 | | 17.0 | 1.0 | 17.41 | 159.2 | | 47.2 | 13,870 |
| 66E | 45D | 17.35 | 35.0 | | 17.0 | 1.0 | 17.41 | 17.35 | 43.75 | | 17.0 | 1.0 | 17.41 | 199.0 | | 47.2 | 15,620 |
| 67E | 52D | 18.75 | | | 38.0 | 1.0 | 18.7 | 18.75 | 4.75 | | 38.0 | 1.0 | 18.7 | 21.6 | | 105.6 | 12,300 |
| 68E | 52D | 18.75 | 4.75 | | 38.0 | 1.0 | 18.7 | 18.75 | 9.50 | | 38.0 | 1.0 | 18.7 | 43.2 | | 105.6 | 13,250 |
| 69E | 52D | 18.75 | 9.50 | | 38.0 | 1.0 | 18.7 | 18.75 | 14.25 | | 38.0 | 1.0 | 18.7 | 64.8 | | 105.6 | 14,200 |
| 70E | 52D | 18.75 | 14.25 | | 38.0 | 1.0 | 18.7 | 18.75 | 19.0 | | 38.0 | 1.0 | 18.7 | 86.4 | | 105.6 | 15,150 |
| 71E | 52D | 18.75 | 19.0 | | 38.0 | 1.0 | 18.7 | 18.75 | 28.5 | | 38.0 | 1.0 | 18.7 | 129.6 | | 105.6 | 17,050 |
| 72E | 52D | 18.75 | 28.5 | | 38.0 | 1.0 | 18.7 | 18.75 | 38.0 | | 38.0 | 1.0 | 18.7 | 172.8 | | 105.6 | 18,950 |
| 73E | 42D | 17.85 | | | 72.0 | 1.5 | 17.85 | 17.85 | | 17.85 | 72.0 | 1.5 | 18.85 | | 61.6 | 199.8 | 21,540 |
| 74E | 42D | 17.85 | | 17.85 | 72.0 | 1.5 | 17.85 | 17.85 | | 35.70 | 72.0 | 1.5 | 17.85 | | 123.2 | 199.8 | 25,110 |
| 75E | 42D | 17.85 | | 35.6 | 72.0 | 1.5 | 17.85 | 17.85 | | 53.55 | 72.0 | 1.5 | 17.85 | | 184.8 | 199.8 | 23,690 |
| 76E | 42D | 17.85 | | 53.55 | 72.0 | 1.5 | 17.85 | 17.85 | | 71.4 | 72.0 | 1.5 | 17.85 | | 246.4 | 199.8 | 32,250 |
| 77E | 42D | 17.85 | | 71.4 | 72.0 | 1.5 | 17.85 | 17.85 | | 89.25 | 72.0 | 1.5 | 17.85 | | 303.0 | 199.8 | 35,820 |
| 78E | 42D | 17.85 | | 89.25 | 72.0 | 1.5 | 17.85 | 17.85 | | 107.1 | 72.0 | 1.5 | 17.85 | | 369.6 | 199.8 | 40,390 |
| 79E | 48D | 17.35 | | | 68.0 | 1.5 | 17.41 | 17.35 | | 17.35 | 68.0 | 1.5 | 17.41 | | 59.8 | 188.8 | 17,990 |
| 80E | 48D | 17.35 | | 17.35 | 68.0 | 1.5 | 17.41 | 17.35 | | 34.70 | 68.0 | 1.5 | 17.41 | | 119.6 | 188.8 | 21,460 |
| 81E | 48D | 17.35 | | 34.7 | 68.0 | 1.5 | 17.41 | 17.35 | | 52.05 | 68.0 | 1.5 | 17.41 | | 179.4 | 188.8 | 24,930 |
| 82E | 48D | 17.35 | | 52.05 | 68.0 | 1.5 | 17.41 | 17.35 | | 69.4 | 68.0 | 1.5 | 17.41 | | 239.2 | 188.8 | 28,400 |
| 83E | 48D | 17.35 | | 69.4 | 68.0 | 1.5 | 17.41 | 17.35 | | 86.75 | 68.0 | 1.5 | 17.41 | | 299.0 | 188.8 | 31,870 |
| 84E | 48D | 17.35 | | 86.75 | 68.0 | 1.5 | 17.41 | 17.35 | | 104.1 | 68.0 | 1.5 | 17.41 | | 358.8 | 188.8 | 35,340 |
| 85E | 54D | 18.75 | | | 66.5 | 1.5 | 18.7 | 18.75 | | 18.75 | 66.5 | 1.5 | 18.7 | | 64.7 | 184.8 | 20,590 |
| 86E | 54D | 18.75 | | 18.75 | 66.5 | 1.5 | 18.7 | 18.75 | | 37.5 | 66.5 | 1.5 | 18.7 | | 129.4 | 184.8 | 24,340 |
| 87E | 54D | 18.75 | | 37.5 | 66.5 | 1.5 | 18.7 | 18.75 | | 56.25 | 66.5 | 1.5 | 18.7 | | 194.1 | 184.8 | 28,070 |
| 88E | 54D | 18.75 | | 56.25 | 66.5 | 1.5 | 18.7 | 18.75 | | 75.0 | 66.5 | 1.5 | 18.7 | | 258.8 | 184.8 | 31,810 |
| 89E | 54D | 18.75 | | 75.0 | 66.5 | 1.5 | 18.7 | 18.75 | | 93.75 | 66.5 | 1.5 | 18.7 | | 323.5 | 184.8 | 35,550 |
| 90E | 54D | 18.75 | | 93.75 | 66.5 | 1.5 | 18.7 | 18.75 | | 112.5 | 66.5 | 1.5 | 18.7 | | 388.2 | 184.8 | 39,290 |

TABLE IX

| Ex. No. | OSC, ex. No. | Composition before | | | | | | Composition at end | | | | | | | Molal ratio | | | Theo. mol. wt. |
|---|---|---|---|---|---|---|---|---|---|---|---|---|---|---|---|---|---|---|
| | | OSC, lbs. | Oxides | | | Catalyst, lbs. | Solvent, lbs. | OSC, lbs. | Oxides | | | Catalyst, lbs. | Solvent, lbs. | EtO to oxyalkyl suscept. cmpd. | PrO to oxyalkyl suscept. cmpd. | BuO to oxyalkyl suscept. cmpd. | |
| | | | EtO, lbs. | PrO, lbs. | BuO, lbs. | | | | EtO, lbs. | PrO, lbs. | BuO, lbs. | | | | | | |
| 1F | 77E | 17.85 | -------- | 89.25 | 72.0 | 1.5 | 17.85 | 17.85 | 4.5 | 89.25 | 72.0 | 1.5 | 17.85 | 20.45 | 308.0 | 199.8 | 36,720 |
| 2F | 77E | 17.85 | 4.5 | 89.25 | 72.0 | 1.5 | 17.85 | 17.85 | 9.0 | 89.25 | 72.0 | 1.5 | 17.85 | 40.9 | 308.0 | 199.8 | 37,620 |
| 3F | 77E | 17.85 | 9.0 | 89.25 | 72.0 | 1.5 | 17.85 | 17.85 | 13.5 | 89.25 | 72.0 | 1.5 | 17.85 | 61.35 | 308.0 | 199.8 | 38,520 |
| 4F | 77E | 17.85 | 13.5 | 89.25 | 72.0 | 1.5 | 17.85 | 17.85 | 18.0 | 89.25 | 72.0 | 1.5 | 17.85 | 81.8 | 308.0 | 199.8 | 39,420 |
| 5F | 77E | 17.85 | 18.0 | 89.25 | 72.0 | 1.5 | 17.85 | 17.85 | 22.5 | 89.25 | 72.0 | 1.5 | 17.85 | 101.25 | 208.0 | 199.8 | 40,320 |
| 6F | 77E | 17.85 | 22.5 | 89.25 | 72.0 | 1.5 | 17.85 | 17.85 | 27.0 | 89.25 | 72.0 | 1.5 | 17.85 | 122.7 | 308.0 | 199.8 | 41,220 |
| 7F | 82E | 17.35 | -------- | 69.4 | 68.0 | 1.5 | 17.41 | 17.35 | 8.75 | 69.4 | 68.0 | 1.5 | 17.41 | 39.8 | 239.2 | 188.8 | 30,150 |
| 8F | 82E | 17.35 | 8.75 | 69.4 | 68.0 | 1.5 | 17.41 | 17.50 | 17.50 | 69.4 | 68.0 | 1.5 | 17.41 | 79.6 | 239.2 | 188.8 | 31,900 |
| 9F | 82E | 17.35 | 17.5 | 69.4 | 68.0 | 1.5 | 17.41 | 17.35 | 21.0 | 69.4 | 68.0 | 1.5 | 17.41 | 95.52 | 239.2 | 188.8 | 32,250 |
| 10F | 82E | 17.35 | 21.0 | 69.4 | 68.0 | 1.5 | 17.41 | 17.35 | 35.0 | 69.4 | 68.0 | 1.5 | 17.41 | 159.2 | 239.2 | 188.8 | 35,400 |
| 11F | 82E | 17.35 | 35.0 | 69.4 | 68.0 | 1.5 | 17.41 | 17.35 | 38.5 | 69.4 | 68.0 | 1.5 | 17.41 | 175.12 | 239.2 | 188.8 | 35,750 |
| 12F | 82E | 17.35 | 38.5 | 69.4 | 68.0 | 1.5 | 17.41 | 17.35 | 42.0 | 69.4 | 68.0 | 1.5 | 17.41 | 191.04 | 239.2 | 188.8 | 36,100 |
| 13F | 88E | 18.75 | -------- | 75.0 | 66.5 | 1.5 | 18.7 | 18.75 | 9.50 | 75.0 | 66.5 | 1.5 | 18.7 | 43.2 | 258.8 | 184.8 | 33,710 |
| 14F | 88E | 18.75 | 9.5 | 75.0 | 66.5 | 1.5 | 18.7 | 18.75 | 14.25 | 75.0 | 66.5 | 1.5 | 18.7 | 64.8 | 258.8 | 184.8 | 34,660 |
| 15F | 88E | 18.75 | 14.25 | 75.0 | .66.5 | 1.5 | 18.7 | 18.75 | 19.0 | 75.0 | 66.5 | 1.5 | 18.7 | 86.4 | 258.8 | 184.8 | 35,610 |
| 16F | 88E | 18.75 | 19.0 | 75.0 | .66.5 | 1.5 | 18.7 | 18.75 | 23.75 | 75.0 | 66.5 | 1.5 | 18.7 | 108.0 | 258.8 | 184.8 | 36,560 |
| 17F | 88E | 18.75 | 23.75 | 75.0 | 66.5 | 1.5 | 18.7 | 18.75 | 28.5 | 75.0 | 66.5 | 1.5 | 18.7 | 129.6 | 258.8 | 184.8 | 37,610 |
| 18F | 88E | 18.75 | 28.5 | 75.0 | 66.5 | 1.5 | 18.7 | 18.75 | 33.25 | 75.0 | 66.5 | 1.5 | 18.7 | 151.2 | 258.8 | 184.8 | 38,560 |
| 19F | 60E | 17.85 | 36.0 | -------- | 24.0 | 1.5 | 17.85 | 17.85 | 36.0 | 9.0 | 24.0 | 1.5 | 17.85 | 163.6 | 31.1 | 66.6 | 17,370 |
| 20F | 60E | 17.85 | 36.0 | 9.0 | 24.0 | 1.5 | 17.85 | 17.85 | 36.0 | 18.0 | 24.0 | 1.5 | 17.85 | 163.6 | 62.6 | 66.6 | 19,170 |
| 21F | 60E | 17.85 | 36.0 | 18.0 | 24.0 | 1.5 | 17.85 | 17.85 | 36.0 | 27.0 | 24.0 | 1.5 | 17.85 | 163.6 | 93.3 | 66.6 | 20,970 |
| 22F | 60E | 17.85 | 36.0 | 27.0 | 24.0 | 1.5 | 17.85 | 17.85 | 36.0 | 36.0 | 24.0 | 1.5 | 17.85 | 163.6 | 124.4 | 66.6 | 22,770 |
| 23F | 60E | 17.85 | 36.0 | 36.0 | 24.0 | 1.5 | 17.85 | 17.85 | 36.0 | 45.0 | 24.0 | 1.5 | 17.85 | 163.6 | 155.5 | 66.6 | 24,570 |
| 24F | 60E | 17.85 | 36.0 | 45.0 | 24.0 | 1.5 | 17.85 | 17.85 | 36.0 | 54.0 | 24.0 | 1.5 | 17.85 | 163.6 | 186.6 | 66.6 | 26,370 |
| 25F | 65E | 17.35 | 35.0 | -------- | 17.0 | 1.5 | 17.41 | 17.35 | 35.0 | 8.5 | 17.0 | 1.5 | 17.41 | 159.2 | 29.35 | 47.2 | 15,570 |
| 26F | 65E | 17.35 | 35.0 | 8.5 | 17.0 | 1.5 | 17.41 | 17.35 | 35.0 | 17.0 | 17.0 | 1.5 | 17.41 | 159.2 | 58.7 | 47.2 | 17,270 |
| 27F | 65E | 17.35 | 35.0 | 17.0 | 17.0 | 1.5 | 17.41 | 17.35 | 35.0 | 25.5 | 17.0 | 1.5 | 17.41 | 159.2 | 88.05 | 47.2 | 18,970 |
| 28F | 65E | 17.35 | 35.0 | 25.5 | 17.0 | 1.5 | 17.41 | 17.35 | 35.0 | 34.0 | 17.0 | 1.5 | 17.41 | 159.2 | 117.4 | 47.2 | 20,670 |
| 29F | 65E | 17.35 | 35.0 | 34.0 | 17.0 | 1.5 | 17.41 | 17.35 | 35.0 | 51.0 | 17.0 | 1.5 | 17.41 | 159.2 | 176.1 | 47.2 | 22,370 |
| 30F | 65E | 17.35 | 35.0 | 51.0 | 17.0 | 1.5 | 17.41 | 17.35 | 35.0 | 68.0 | 17.0 | 1.5 | 17.41 | 159.2 | 234.8 | 47.2 | 24,070 |
| 31F | 72E | 18.75 | 38.0 | -------- | 38.0 | 1.5 | 18.7 | 18.75 | 38.0 | 9.5 | 38.0 | 1.5 | 18.7 | 172.8 | 32.8 | 105.6 | 20,850 |
| 32F | 72E | 18.75 | 38.0 | 9.5 | 38.0 | 1.5 | 18.7 | 18.75 | 38.0 | 19.0 | 38.0 | 1.5 | 18.7 | 172.8 | 65.6 | 105.6 | 22,750 |
| 33F | 72E | 18.75 | 38.0 | 19.0 | 38.0 | 1.5 | 18.7 | 18.75 | 38.0 | 28.5 | 38.0 | 1.5 | 18.7 | 172.8 | 98.4 | 105.6 | 24,650 |
| 34F | 72E | 18.75 | 38.0 | 28.5 | 38.0 | 1.5 | 18.7 | 18.75 | 38.0 | 38.0 | 38.0 | 1.5 | 18.7 | 172.8 | 131.2 | 105.6 | 26,550 |
| 35F | 72E | 18.75 | 38.0 | 38.0 | 38.0 | 1.5 | 18.7 | 18.75 | 38.0 | 47.5 | 38.0 | 1.5 | 18.7 | 172.8 | 164.0 | 105.6 | 28,450 |
| 36F | 72E | 18.75 | 38.0 | 47.5 | 38.0 | 1.5 | 18.7 | 18.75 | 38.0 | 57.0 | 3.0 | 1.5 | 18.7 | 172.8 | 196.8 | 105.6 | 30,350 |

TABLE X

| Ex. No. | Max. temp., °C. | Max. pres., p.s.i. | Time, hrs. | Solubility | | |
|---|---|---|---|---|---|---|
| | | | | Water | Xylene | Kerosene |
| 1D | 125-130 | 10-15 | ½ | Insoluble | Soluble | Insoluble. |
| 2D | 125-130 | 10-15 | ½ | ----do---- | ----do---- | Do. |
| 3D | 125-130 | 10-15 | ¾ | Emulsifiable | ----do---- | Do. |
| 4D | 125-130 | 10-15 | ¾ | ----do---- | ----do---- | Do. |
| 5D | 125-130 | 10-15 | 2½ | Soluble | ----do---- | Do. |
| 6D | 125-130 | 10-15 | 3 | ----do---- | Insoluble | Do. |
| 7D | 125-130 | 10-15 | ¾ | Insoluble | Soluble | Do. |
| 8D | 125-130 | 10-15 | 1 | Emulsifiable | ----do---- | Do. |
| 9D | 125-130 | 10-15 | 1 | ----do---- | ----do---- | Do. |
| 10D | 125-130 | 10-15 | 1½ | Soluble | ----do---- | Do. |
| 11D | 125-130 | 10-15 | 3 | ----do---- | Insoluble | Do. |
| 12D | 125-130 | 10-15 | 3½ | ----do---- | ----do---- | Do. |
| 13D | 125-130 | 10-15 | ¾ | Insoluble | Soluble | Do. |
| 14D | 125-130 | 10-15 | 1 | Emulsifiable | ----do---- | Do. |
| 15D | 125-130 | 10-15 | 1 | ----do---- | ----do---- | Do. |
| 16D | 125-130 | 10-15 | 1½ | Soluble | ----do---- | Do. |
| 17D | 125-130 | 10-15 | 3 | ----do---- | Insoluble | Do. |
| 18D | 125-130 | 10-15 | 3½ | ----do---- | ----do---- | Do. |
| 19D | 125-130 | 10-15 | 1½ | Insoluble | Soluble | Do. |
| 20D | 125-130 | 10-15 | 2 | ----do---- | ----do---- | Do. |
| 21D | 125-130 | 10-15 | 2 | ----do---- | ----do---- | Do. |
| 22D | 125-130 | 10-15 | 2½ | ----do---- | ----do---- | Do. |
| 23D | 125-130 | 10-15 | 3 | ----do---- | ----do---- | Soluble. |
| 24D | 125-130 | 10-15 | 4½ | ----do---- | ----do---- | Do. |
| 25D | 125-130 | 10-15 | 2 | ----do---- | ----do---- | Insoluble. |
| 26D | 125-130 | 10-15 | 2 | ----do---- | ----do---- | Do. |
| 27D | 125-130 | 10-15 | 2¾ | ----do---- | ----do---- | Do. |
| 28D | 125-130 | 10-15 | 3 | ----do---- | ----do---- | Do. |
| 29D | 125-130 | 10-15 | 4½ | ----do---- | ----do---- | Soluble. |
| 30D | 125-130 | 10-15 | 5½ | ----do---- | ----do---- | Do. |
| 31D | 125-130 | 10-15 | 2¼ | ----do---- | ----do---- | Insoluble. |
| 32D | 125-130 | 10-15 | 2½ | ----do---- | ----do---- | Do. |
| 33D | 125-130 | 10-15 | 3 | ----do---- | ----do---- | Do. |
| 34D | 125-130 | 10-15 | 3½ | ----do---- | ----do---- | Do. |
| 35D | 125-130 | 10-15 | 4 | ----do---- | ----do---- | Soluble. |
| 36D | 125-130 | 10-15 | 6 | ----do---- | ----do---- | Do. |
| 37D | 145-150 | 10-15 | 1½ | ----do---- | ----do---- | Insoluble. |
| 38D | 145-150 | 10-15 | 1¾ | ----do---- | ----do---- | Do. |
| 39D | 145-150 | 10-15 | 2 | ----do---- | ----do---- | Do. |
| 40D | 145-150 | 10-15 | 2 | ----do---- | ----do---- | Do. |
| 41D | 145-150 | 10-15 | 4 | ----do---- | ----do---- | Do. |
| 42D | 145-150 | 10-15 | 12 | ----do---- | ----do---- | Soluble. |
| 43D | 145-150 | 10-15 | 1¼ | ----do---- | ----do---- | Insoluble. |
| 44D | 145-150 | 10-15 | 1½ | ----do---- | ----do---- | Do. |
| 45D | 145-150 | 10-15 | 3 | ----do---- | ----do---- | Do. |
| 46D | 145-150 | 10-15 | 6 | ----do---- | ----do---- | Do. |
| 47D | 145-150 | 10-15 | 3½ | ----do---- | ----do---- | Soluble. |
| 48D | 145-150 | 10-15 | 9½ | ----do---- | ----do---- | Do. |
| 49D | 145-150 | 10-15 | 1½ | ----do---- | ----do---- | Insoluble. |
| 50D | 145-150 | 10-15 | 1½ | ----do---- | ----do---- | Do. |
| 51D | 145-150 | 10-15 | 3 | ----do---- | ----do---- | Do. |
| 52D | 145-150 | 10-15 | 6 | ----do---- | ----do---- | Do. |
| 53D | 145-150 | 10-15 | 3½ | ----do---- | ----do---- | Soluble. |
| 54D | 145-150 | 10-15 | 6¾ | ----do---- | ----do---- | Do. |

TABLE XI

| Ex. No. | Max. temp., °C. | Max. pres., p.s.i. | Time, hrs. | Solubility | | |
|---|---|---|---|---|---|---|
| | | | | Water | Xylene | Kerosene |
| 1E | 125–130 | 10–15 | 8 | Emulsifiable | Soluble | Insoluble. |
| 2E | 125–130 | 10–15 | 2½ | do | do | Do. |
| 3E | 125–130 | 10–15 | 3 | do | do | Do. |
| 4E | 125–130 | 10–15 | 3 | do | do | Do. |
| 5E | 125–130 | 10–15 | 3½ | do | do | Do. |
| 6E | 125–130 | 10–15 | 5 | do | do | Do. |
| 7E | 125–130 | 10–15 | 5 | do | do | Do. |
| 8E | 125–130 | 10–15 | 2½ | do | do | Do. |
| 9E | 125–130 | 10–15 | 2¾ | do | do | Do. |
| 10E | 125–130 | 10–15 | 3 | do | do | Do. |
| 11E | 125–130 | 10–15 | 3½ | do | do | Do. |
| 12E | 125–130 | 10–15 | 4¾ | do | do | Do. |
| 13E | 125–130 | 10–15 | 10 | do | do | Do. |
| 14E | 125–130 | 10–15 | 3 | do | do | Do. |
| 15E | 125–130 | 10–15 | 3¼ | do | do | Do. |
| 16E | 125–130 | 10–15 | 3¾ | do | do | Do. |
| 17E | 125–130 | 10–15 | 4¾ | do | do | Do. |
| 18E | 125–130 | 10–15 | 6½ | do | do | Do. |
| 19E | 125–130 | 10–15 | 16 | Insoluble | do | Soluble. |
| 20E | 125–130 | 10–15 | ¾ | do | do | Do. |
| 21E | 125–130 | 10–15 | 1 | do | do | Insoluble. |
| 22E | 125–130 | 10–15 | 1 | Emulsifiable | do | Do. |
| 23E | 125–130 | 10–15 | 2 | do | do | Do. |
| 24E | 125–130 | 10–15 | 2½ | do | do | Do. |
| 25E | 125–130 | 10–15 | 21 | Insoluble | do | Soluble. |
| 26E | 125–130 | 10–15 | 1¼ | Emulsifiable | do | Insoluble. |
| 27E | 125–130 | 10–15 | 1¾ | do | do | Do. |
| 28E | 125–130 | 10–15 | 2 | do | do | Do. |
| 29E | 125–130 | 10–15 | 3 | do | do | Do. |
| 30E | 125–130 | 10–15 | 4½ | do | do | Do. |
| 31E | 125–130 | 10–15 | 22 | Insoluble | do | Soluble. |
| 32E | 125–130 | 10–15 | 1 | do | do | Do. |
| 33E | 125–130 | 10–15 | 1½ | do | do | Do. |
| 34E | 125–130 | 10–15 | 4½ | Emulsifiable | do | Insoluble. |
| 35E | 125–130 | 10–15 | 3 | do | do | Do. |
| 36E | 125–130 | 10–15 | 4 | do | do | Do. |
| 37E | 125–145 | 10–15 | 10 | do | do | Do. |
| 38E | 145–150 | 10–15 | 2 | do | do | Do. |
| 39E | 145–150 | 10–15 | 2¾ | do | do | Do. |
| 40E | 145–150 | 10–15 | 3 | do | do | Do. |
| 41E | 145–150 | 10–15 | 6 | do | do | Do. |
| 42E | 145–150 | 10–15 | 12 | do | do | Do. |
| 43E | 125–145 | 10–15 | 9 | do | do | Do. |
| 44E | 145–150 | 10–15 | 1½ | do | do | Do. |
| 45E | 145–150 | 10–15 | 3 | do | do | Do. |
| 46E | 145–150 | 10–15 | 6 | do | do | Do. |
| 47E | 145–150 | 10–15 | 3¾ | do | do | Do. |
| 48E | 145–150 | 10–15 | 8 | do | do | Do. |
| 49E | 125–145 | 10–15 | 6 | do | do | Do. |
| 50E | 145–150 | 10–15 | 1½ | do | do | Do. |
| 51E | 145–150 | 10–15 | 3 | do | do | Do. |
| 52E | 145–150 | 10–15 | 6 | do | do | Do. |
| 53E | 145–150 | 10–15 | 4 | do | do | Do. |
| 54E | 145–150 | 10–15 | 8 | do | do | Do. |
| 55E | 150–125 | 10–15 | 7¾ | Insoluble | do | Do. |
| 56E | 125–130 | 10–15 | ½ | Emulsifiable | do | Do. |
| 57E | 125–130 | 10–15 | ¾ | do | do | Do. |
| 58E | 125–130 | 10–15 | 1 | do | do | Do. |
| 59E | 125–130 | 10–15 | 3 | do | do | Do. |
| 60E | 125–130 | 10–15 | 3½ | do | do | Do. |
| 61E | 150–125 | 10–15 | 6½ | do | do | Do. |
| 62E | 125–130 | 10–15 | ¾ | do | do | Do. |
| 63E | 125–130 | 10–15 | 1½ | do | do | Do. |
| 64E | 125–130 | 10–15 | 1½ | do | do | Do. |
| 65E | 125–130 | 10–15 | 2 | do | do | Do. |
| 66E | 125–130 | 10–15 | 2½ | do | do | Do. |
| 67E | 150–125 | 10–15 | 13 | Insoluble | do | Do. |
| 68E | 125–130 | 10–15 | 1 | Emulsifiable | do | Do. |
| 69E | 125–130 | 10–15 | 1 | do | do | Do. |
| 70E | 125–130 | 10–15 | 1 | do | do | Do. |
| 71E | 125–130 | 10–15 | 4 | do | do | Do. |
| 72E | 125–130 | 10–15 | 3 | do | do | Do. |
| 73E | 150–125 | 10–15 | 25 | Insoluble | do | Soluble. |
| 74E | 125–130 | 10–15 | 3 | do | do | Do. |
| 75E | 125–130 | 10–15 | 3½ | do | do | Do. |
| 76E | 125–130 | 10–15 | 4 | do | do | Do. |
| 77E | 125–130 | 10–15 | 5 | do | do | Do. |
| 78E | 125–130 | 10–15 | 7 | do | do | Do. |
| 79E | 150–125 | 10–15 | 27 | do | do | Do. |
| 80E | 125–130 | 10–15 | 3 | do | do | Do. |
| 81E | 125–130 | 10–15 | 3¼ | do | do | Do. |
| 82E | 125–130 | 10–15 | 3¾ | do | do | Do. |
| 83E | 125–130 | 10–15 | 5 | do | do | Do. |
| 84E | 125–130 | 10–15 | 6¾ | do | do | Do. |
| 85E | 150–125 | 10–15 | 24¾ | do | do | Do. |
| 86E | 125–130 | 10–15 | 2¾ | do | do | Do. |
| 87E | 125–130 | 10–15 | 3½ | do | do | Do. |
| 88E | 125–130 | 10–15 | 4 | do | do | Do. |
| 89E | 125–130 | 10–15 | 4¾ | do | do | Do. |
| 90E | 125–130 | 10–15 | 6 | do | do | Do. |

TABLE XII

| Ex. No. | Max. temp., °C. | Max. pres., p. s. i. | Time, hrs. | Solubility ||| 
|---|---|---|---|---|---|---|
| | | | | Water | Xylene | Kerosene |
| 1F | 150-125 | 10-15 | 41 | Insoluble | Soluble | Soluble. |
| 2F | 125-130 | 10-15 | 1½ | ---do--- | ---do--- | Do. |
| 3F | 125-130 | 10-15 | 2 | ---do--- | ---do--- | Do. |
| 4F | 125-130 | 10-15 | 3 | ---do--- | ---do--- | Do. |
| 5F | 125-130 | 10-15 | 5 | ---do--- | ---do--- | Do. |
| 6F | 125-130 | 10-15 | 6½ | Emulsifiable | ---do--- | Insoluble. |
| 7F | 150-125 | 10-15 | 39 | Insoluble | ---do--- | Soluble. |
| 8F | 125-130 | 10-15 | 2¾ | Emulsifiable | ---do--- | Insoluble. |
| 9F | 125-130 | 10-15 | 1 | ---do--- | ---do--- | Do. |
| 10F | 125-130 | 10-15 | 4½ | ---do--- | ---do--- | Do. |
| 11F | 125-130 | 10-15 | 3 | ---do--- | ---do--- | Do. |
| 12F | 125-130 | 10-15 | 3 | ---do--- | ---do--- | Do. |
| 13F | 150-125 | 10-15 | 36 | Insoluble | ---do--- | Soluble. |
| 14F | 125-130 | 10-15 | 1 | Emulsifiable | ---do--- | Insoluble. |
| 15F | 125-130 | 10-15 | 1½ | ---do--- | ---do--- | Do. |
| 16F | 125-130 | 10-15 | 2 | ---do--- | ---do--- | Do. |
| 17F | 125-130 | 10-15 | 3 | ---do--- | ---do--- | Do. |
| 18F | 125-130 | 10-15 | 3½ | ---do--- | ---do--- | Do. |
| 19F | 150-125 | 10-15 | 18 | ---do--- | ---do--- | Do. |
| 20F | 125-130 | 10-15 | 2¾ | ---do--- | ---do--- | Do. |
| 21F | 125-130 | 10-15 | 3 | ---do--- | ---do--- | Do. |
| 22F | 125-130 | 10-15 | 3 | ---do--- | ---do--- | Do. |
| 23F | 125-130 | 10-15 | 3½ | ---do--- | ---do--- | Do. |
| 24F | 125-130 | 10-15 | 4 | ---do--- | ---do--- | Do. |
| 25F | 150-125 | 10-15 | 14 | ---do--- | ---do--- | Do. |
| 26F | 125-130 | 10-15 | 3 | ---do--- | ---do--- | Do. |
| 27F | 125-130 | 10-15 | 3½ | ---do--- | ---do--- | Do. |
| 28F | 125-130 | 10-15 | 3¾ | ---do--- | ---do--- | Do. |
| 29F | 125-130 | 10-15 | 6½ | ---do--- | ---do--- | Do. |
| 30F | 125-130 | 10-15 | 7 | ---do--- | ---do--- | Do. |
| 31F | 150-125 | 10-15 | 25 | ---do--- | ---do--- | Do. |
| 32F | 125-130 | 10-15 | 3 | ---do--- | ---do--- | Do. |
| 33F | 125-130 | 10-15 | 3½ | ---do--- | ---do--- | Do. |
| 34F | 125-130 | 10-15 | 4 | ---do--- | ---do--- | Do. |
| 35F | 125-130 | 10-15 | 5 | ---do--- | ---do--- | Do. |
| 36F | 125-130 | 10-15 | 7 | ---do--- | ---do--- | Do. |

PART 7

As to the use of conventional demulsifying agents reference is made to U. S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 54D, herein described.

Having thus described our invention, what we claim as new and desire to secure by Letters Patent is:

1. A process for breaking petroleum emulsions of the water-in-oil type characterized by subjecting the emulsion to the action of a demulsifier, said demulsifier being obtained by a 3-step manufacturing method involving (1) condensation; (2) oxyalkylation with a polyepoxide; and (3) oxyalkylation with a monoepoxide; said first step being that of (A) condensing (a) an oxyalkylation-susceptible, fusible, nonoxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

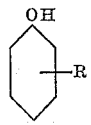

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat stable and oxyalkylation-susceptible; followed as a second step by (B) reacting said resin condensate with nonaryl hydrophile polyepoxides characterized by the fact that the precursory polyhydric alcohol, in which an oxygen-linked hydrogen atom is replaced subsequently by the radical

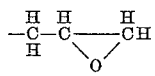

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; with the further proviso that said reactive compounds (A) and (B) be members of the class consisting of non-thermosetting solvent-soluble liquids and low-melting solids; with the added proviso that the reaction product be a member of the class of acylation- and oxyalkylation-susceptible solvent-soluble liquids and low-melting solids; and said reaction between (A) and (B) being conducted below the pyrolytic point of the reactants and the resultants of reaction; and with the final proviso that the ratio of reactants be 2 moles of the resin condensate to 1 mole of the polyepoxide, and then completing the reaction by a third step of (C) reacting said polyepoxide-derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

2. A process for breaking petroleum emulsions of the water-in-oil type characterized by subjecting the emulsion to the action of a demulsifier, said demulsifier being obtained by a 3-step manufacturing method involving (1) condensation; (2) oxyalkylation with a polyepoxide; and (3) oxyalkylation with a monoepoxide; said first step being that of (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

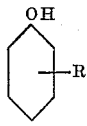

in which R is an aliphatic hydrocarbon radical having at least 4 and not more than 24 carbon atoms and substituted in the 2, 4, 6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat stable and oxyalkylation-susceptible followed as a second step by (B) reacting said resin condensate with nonaryl hydrophile polyepoxides characterized by the fact that the precursory polyhydric alcohol, in which an oxygen-linked hydrogen atom is replaced subsequently by the radical

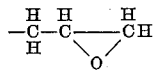

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; said polyepoxides being characterized by having present not more than 20 carbon atoms; with the further proviso that said reactive compounds (A) and (B) be members of the class consisting of non-thermosetting solvent-soluble liquids and low-melting solids; with the added proviso that the reaction product be a member of the class of acylation- and oxyalkylation-susceptible solvent-soluble liquids and low-melting solids; and said reaction between (A) and (B) being conducted below the pyrolytic point of the reactants and the resultants of reaction; and with the final proviso that the ratio of reactants be 2 moles of the resin condensate to 1 mole of the polyepoxide, and then completing the reaction by a third step of (C) reacting said polyepoxide-derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

3. A process for breaking petroleum emulsions of the water-in-oil type characterized by subjecting the emulsion to the action of a demulsifier, said demulsifier being obtained by a 3-step manufacturing method involving (1) condensation; (2) oxyalkylation with a diepoxide; and (3) oxyalkylation with a monoepoxide; said first step being that of (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

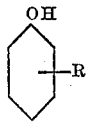

in which R is an aliphatic hydrocarbon radical having at least 4 and not more than 24 carbon atoms and substituted in the 2, 4, 6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed as a second step by (B) reacting said resin condensate with nonaryl hydrophile diepoxides characterized by the fact that the precursory polyhydric alcohol, in which an oxygen-linked hydrogen atom is replaced subsequently by the radical

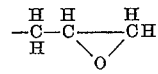

in the diepoxide is water-soluble; said diepoxides being free from reactive functional groups other than epoxy and hydroxyl groups and characterized by the fact that the divalent linkage uniting the terminal oxirane rings is free from any radical having more than 4 uninterrupted carbon atoms in a single chain; said diepoxides being characterized by having present not more than 20 carbon atoms; with the further proviso that said reactive compounds (A) and (B) be members of the class consisting of non-thermosetting solvent-soluble liquids and low-melting solids; with the added proviso that the reaction product be a member of the class of acylation- and oxyalkylation-susceptible solvent-soluble liquids and low-melting solids; and said reaction between (A) and (B) being conducted below the pyrolytic point of the reactants and the resultants of reaction; and with the final proviso that the ratio of reactants be 2 moles of the resin condensate to 1 mole of the diepoxide, and then completing the reaction by a third step of (C) reacting said diepoxide-derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

4. The process of claim 3 wherein the diepoxide contains at least one reactive hydroxyl radical.

5. A process for breaking petroleum emulsions of the water-in-oil type characterized by subjecting the emulsion to the action of a demulsifier, said demulsifier being obtained by a 3-step manufacturing method involving (1) condensation; (2) oxyalkylation with a diepoxide, and (3) oxyalkylation with a monepoxide; said first step being that of (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol;

said resin being formed in the substantial absence of trifunctional phenols; said phenol being of the formula

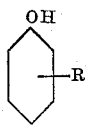

in which R is an aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed as a second step by (B) reacting said resin condensate with a hydroxylated diepoxypolyglycerol having not more than 20 carbon atoms; with the further proviso that said reactive compounds (A) and (B) be members of the class consisting of non-thermosetting solvent-soluble liquids and low-melting solids; with the added proviso that the reaction product be a member of the class of acylation- and oxyalkylation-susceptible solvent-soluble liquids and low-melting solids; and said reaction between (A) and (B) being conducted below the pyrolytic point of the reactants and the resultants of reaction; and with the final proviso that the ratio of reactants be 2 moles of the resin condensate to 1 mole of the diepoxide; and then completing the reaction by a third step of (C) reacting said diepoxide-derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

6. The process of claim 5 wherein the polyglycerol derivative has not over 5 glycerol nuclei.

7. The process of claim 5 wherein the polyglycerol derivative has not over 5 glycerol nuclei, and the precursory phenol is para-substituted.

8. The process of claim 5 wherein the polyglycerol derivative has not over 5 glycerol nuclei, and the precursory phenol is para-substituted and contains at least 4 and not over 14 carbon atoms in the substituent group.

9. The process of claim 5 wherein the polyglycerol derivative has not over 5 glycerol nuclei, and the precursory phenol is para-substituted and contains at least 4 and not over 14 carbon atoms in the substituent group, and the precursory aldehyde is formaldehyde.

10. The process of claim 5 wherein the polyglycerol derivative has not over 5 glycerol nuclei, and the precursory phenol is para-substituted and contains at least 4 and not over 14 carbon atoms in the substituent group, and the precursory aldehyde is formaldehyde, and the total number of phenolic nuclei in the initial resin are not over 5.

11. The process of claim 1 with the proviso that the hydrophile properties of the product of the condensation reaction employed in the form of a member of the class consisting of (a) the anhydro base as is, (b) the free base, and (c) the salt of gluconic acid, in an equal weight of xylene are sufficient to produce an emulsion when said xylene solution is shaken vigorously with 1 to 3 volumes of water.

12. The process of claim 2 with the proviso that the hydrophile properties of the product of the condensation reaction employed in the form of a member of the class consisting of (a) the anhydro base as is (b) the free base, and (c) the salt of gluconic acid, in an equal weight of xylene are sufficient to produce an emulsion when said xylene solution is shaken vigorously with 1 to 3 volumes of water.

13. The process of claim 3 with the proviso that the hydrophile properties of the product of the condensation reaction employed in the form of a member of the class consisting of (a) the anhydro base as is (b) the free base, and (c) the salt of gluconic acid, in an equal weight of xylene are sufficient to produce an emulsion when said xylene solution is shaken vigorously with 1 to 3 volumes of water.

14. The process of claim 4 with the proviso that the hydrophile properties of the product of the condensation reaction employed in the form of a member of the class consisting of (a) the anhydro base as is (b) the free base, and (c) the salt of gluconic acid, in an equal weight of xylene are sufficient to produce an emulsion when said xylene solution is shaken vigorously with 1 to 3 volumes of water.

15. The process of claim 5 with the proviso that the hydrophile properties of the product of the condensation reaction employed in the form of a member of the class consisting of (a) the anhydro base as is (b) the free base, and (c) the salt of gluconic acid, in an equal weight of xylene are sufficient to produce an emulsion when said xylene solution is shaken vigorously with 1 to 3 volumes of water.

16. The process of claim 6 with the proviso that the hydrophile properties of the product of the condensation reaction employed in the form of a member of the class consisting of (a) the anhydro base as is (b) the free base, and (c) the salt of gluconic acid, in an equal weight of xylene are sufficient to produce an emulsion when said xylene solution is shaken vigorously with 1 to 3 volumes of water.

17. The process of claim 7 with the proviso that the hydrophile properties of the product of the condensation reaction employed in the form of a member of the class consisting of (a) the anhydro base as is (b) the free base, and (c) the salt of gluconic acid, in an equal weight of xylene are sufficient to produce an emulsion when said xylene solution is shaken vigorously with 1 to 3 volumes of water.

18. The process of claim 8 with the proviso that the hydrophile properties of the product of the condensation reaction employed in the form of a member of the class consisting of (a) the anhydro base as is (b) the free base, and (c) the salt of gluconic acid, in an equal weight of xylene are sufficient to produce an emulsion when said xylene solution is shaken vigorously with 1 to 3 volumes of water.

19. The process of claim 9 with the proviso that the hydrophile properties of the product of the condensation reaction employed in the form of a member of the class consisting of (a) the anhydro base as is (b) the free base, and (c) the salt of gluconic acid, in an equal weight of xylene are sufficient to produce an emulsion when said xylene solution is shaken vigorously with 1 to 3 volumes of water.

20. The process of claim 10 with the proviso that the hydrophile properties of the product of the condensation reaction employed in the form of a member of the class consisting of (a) the anhydro base as is (b) the free base, and (c) the salt of gluconic acid, in an equal weight of xylene are sufficient to produce an emulsion when said xylene solution is shaken vigorously with 1 to 3 volumes of water.

References Cited in the file of this patent

UNITED STATES PATENTS

| | | |
|---|---|---|
| 2,395,739 | Hersberger | Feb. 26, 1946 |
| 2,454,541 | Bock et al. | Nov. 23, 1948 |
| 2,457,634 | Bond et al. | Dec. 28, 1948 |
| 2,589,198 | Monson | Mar. 11, 1952 |
| 2,695,891 | De Groote | Nov. 30, 1954 |